US009420251B2

(12) United States Patent
Inoue

(10) Patent No.: US 9,420,251 B2
(45) Date of Patent: Aug. 16, 2016

(54) IMAGING DEVICE AND INFORMATION ACQUISITION SYSTEM IN WHICH AN ACQUIRED IMAGE AND ASSOCIATED INFORMATION ARE HELD ON A DISPLAY

(75) Inventor: Hideya Inoue, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 456 days.

(21) Appl. No.: 13/021,198

(22) Filed: Feb. 4, 2011

(65) Prior Publication Data

US 2011/0193985 A1    Aug. 11, 2011

Related U.S. Application Data

(60) Provisional application No. 61/306,171, filed on Feb. 19, 2010.

(30) Foreign Application Priority Data

Feb. 8, 2010 (JP) .................................. 2010-25998

(51) Int. Cl.
H04N 9/82 (2006.01)
H04N 5/232 (2006.01)
(Continued)

(52) U.S. Cl.
CPC ......... *H04N 9/8205* (2013.01); *H04N 1/32144* (2013.01); *H04N 5/23216* (2013.01); *H04N 5/772* (2013.01); *H04N 21/4223* (2013.01); *H04N 21/42202* (2013.01); *H04N 21/4334* (2013.01); *H04N 21/8133* (2013.01); *H04N 21/8153* (2013.01); *H04N 1/00323* (2013.01); *H04N 2101/00* (2013.01); *H04N 2201/3253* (2013.01); *H04N 2201/3273* (2013.01)

(58) Field of Classification Search
CPC .............. H04N 2101/00; H04N 5/272; H04N 2201/3245; H04N 9/8205
USPC ....................................................... 348/231.3
See application file for complete search history.

(56) References Cited

U.S. PATENT DOCUMENTS 6,282,362 B1    8/2001    Murphy et al.
7,016,899 B1    3/2006    Stern et al.
(Continued)

FOREIGN PATENT DOCUMENTS

EP    1 703 426 A1    9/2006
EP    1 939 684 A1    7/2008
(Continued)

OTHER PUBLICATIONS

Takebe, K., *Nikkei Communications*, Nov. 1, 2008, pp. 46-51, No. 521, Nikkei Business Publications, Inc. (with translation).

(Continued)

*Primary Examiner* — Roberto Velez
*Assistant Examiner* — Cynthia Segura
(74) *Attorney, Agent, or Firm* — Oliff PLC

(57) ABSTRACT

The imaging device of the invention includes an imaging portion that images a subject; a positional information acquisition portion that acquires positional information of an imaging position; a control portion which acquires information on the subject based on the positional information, and displays image data of the subject and the information on the subject on a display portion; and a hold control portion that outputs a hold control signal, which holds the image data of the subject and the information on the subject, to the control portion.

74 Claims, 12 Drawing Sheets

(51) Int. Cl.
*H04N 5/77* (2006.01)
*H04N 21/422* (2011.01)
*H04N 21/433* (2011.01)
*H04N 21/81* (2011.01)
*H04N 1/32* (2006.01)
*H04N 21/4223* (2011.01)
*H04N 1/00* (2006.01)
*H04N 101/00* (2006.01)

(56) References Cited

U.S. PATENT DOCUMENTS

| | | | |
|---|---|---|---|
| 7,119,831 B2* | 10/2006 | Ohto et al. | 348/135 |
| 7,720,436 B2 | 5/2010 | Hamynen et al. | |
| 8,301,202 B2* | 10/2012 | Lee | 455/566 |
| 8,730,337 B2* | 5/2014 | Inoue et al. | 348/211.5 |
| 8,823,855 B2* | 9/2014 | Hwang | 348/333.02 |
| 9,007,401 B1* | 4/2015 | Cho et al. | 345/633 |
| 9,046,918 B2* | 6/2015 | Kim et al. | |
| 2004/0189813 A1 | 9/2004 | Tanaka | |
| 2005/0001024 A1 | 1/2005 | Kusaka et al. | |
| 2005/0046706 A1 | 3/2005 | Sesek et al. | |
| 2006/0001757 A1* | 1/2006 | Sawachi | 348/333.12 |
| 2006/0155466 A1 | 7/2006 | Kanda et al. | |
| 2006/0190812 A1* | 8/2006 | Ellenby et al. | 715/512 |
| 2006/0193623 A1 | 8/2006 | Funakura | |
| 2006/0250507 A1 | 11/2006 | Miyajima et al. | |
| 2007/0162942 A1 | 7/2007 | Hamynen et al. | |
| 2008/0147730 A1* | 6/2008 | Lee et al. | 707/104.1 |
| 2009/0096875 A1 | 4/2009 | Yoshimaru et al. | |
| 2009/0198661 A1 | 8/2009 | Miyajima et al. | |
| 2010/0023878 A1* | 1/2010 | Douris | H04L 12/6418 715/757 |
| 2010/0039505 A1* | 2/2010 | Inoue et al. | 348/61 |
| 2010/0149399 A1* | 6/2010 | Mukai et al. | 348/333.02 |
| 2011/0071757 A1* | 3/2011 | Lee et al. | 701/208 |
| 2011/0161875 A1* | 6/2011 | Kankainen | 715/810 |
| 2011/0254861 A1* | 10/2011 | Emura | G06F 3/0488 345/633 |
| 2012/0092528 A1* | 4/2012 | Jung et al. | 348/239 |
| 2012/0099000 A1* | 4/2012 | Kim | 348/231.99 |
| 2012/0307075 A1* | 12/2012 | Margalit | G06T 1/0007 348/180 |
| 2014/0111543 A1* | 4/2014 | Kim | 345/633 |
| 2014/0375679 A1* | 12/2014 | Margolis | G09G 3/3208 345/633 |
| 2014/0376047 A1* | 12/2014 | Fujikura | 358/1.15 |
| 2015/0070389 A1* | 3/2015 | Goto | G06T 7/00 345/633 |
| 2015/0199848 A1* | 7/2015 | Kim et al. | G06T 19/00 |
| 2015/0352441 A1* | 12/2015 | Lin | A63F 13/25 3/25 |

FOREIGN PATENT DOCUMENTS

| | | |
|---|---|---|
| EP | 2 154 481 A1 | 2/2010 |
| JP | A-2002-94870 | 3/2002 |
| JP | A-2003-174578 | 6/2003 |
| JP | A-2004-15187 | 1/2004 |
| JP | A-2004-341960 | 12/2004 |
| JP | A-2005-265551 | 9/2005 |
| JP | A-2006-3963 | 1/2006 |
| JP | A-2006-171959 | 6/2006 |
| JP | A-2006-194665 | 7/2006 |
| JP | A-2006-235979 | 9/2006 |
| JP | A-2006-260338 | 9/2006 |
| JP | A-2006-295827 | 10/2006 |
| JP | A-2008-76734 | 4/2008 |
| JP | A-2008-77311 | 4/2008 |
| JP | A-2008-111693 | 5/2008 |
| JP | A-2008-210364 | 9/2008 |
| JP | A-2008-250474 | 10/2008 |
| JP | A-2009-17540 | 1/2009 |
| JP | A-2009-60339 | 3/2009 |
| WO | WO 2008149537 A1 * 12/2008 | G01C 21/00 |

OTHER PUBLICATIONS

Hashimoto et al., "Outdoor Annotation System by Sensor Fusion," *IEICE Technical Report*, Sep. 5, 2006, pp. 97-102, vol. 106, No. 234 (with translation).
International Search Report issued in International Application No. PCT/JP2011/052498 on Apr. 5, 2011 (with translation).
Apr. 5, 2011 Written Opinion of the International Searching Authority issued in Application No. PCT/JP2011/052498 (with translation).
Chinese Patent Office, The First Official Letter mailed Sep. 23, 2014 in Chinese Patent Application No. 201180008654.3 w/English-language Translation.
Japanese Patent Office, Notice of Reasons for Rejection mailed Sep. 30, 2014 in Japanese Patent Application No. 2011-552853 w/English-language Translation.
Dec. 15, 2014 Search Report issued in European Application No. 11739908.9.
Takacs, G. et al., "Outdoors Augmented Reality on Mobile Phone using Loxel-Based Visual Feature Organization", Proceedings of the Workshop on Multimedia Information Retrieval(MIRO), XX, Vancouver, B.C., Canada, XP007915264, Oct. 27, 2008, pp. 427-434.
Jul. 13, 2015 Office Action issued in Chinese Patent Application No. 201180008654.3.

* cited by examiner

FIG. 2

| STRUCTURE IDENTIFICATION INFORMATION | STRUCTURE NAME | STRUCTURE INFORMATION | POSITIONAL INFORMATION (LATITUDE AND LONGITUDE) | AZIMUTHAL INFORMATION | DESCRIPTION | SUBMISSION INFORMATION |
|---|---|---|---|---|---|---|
| | | | | | | |
| | | | | | | |
| | | | | | | | ial
IMAGING DEVICE AND INFORMATION ACQUISITION SYSTEM IN WHICH AN ACQUIRED IMAGE AND ASSOCIATED INFORMATION ARE HELD ON A DISPLAY

CROSS-REFERENCE TO RELATED APPLICATION

This application is a non-provisional application claiming priority to and the benefit of U.S. provisional application No. 61/306,171 . filed Feb. 19, 2010 and Japanese Patent Application No. 2010-025998 . filed Feb. 8, 2010 . The entire contents of which are incorporated herein by reference.

FIELD OF THE INVENTION

The present invention relates to an imaging device which has a function of acquiring information of a position where a subject is imaged upon imaging the subject, thereby making the subject correspond to the positional information; an imaging device, an information acquisition system, and a program which acquire the information of the subject using the information.

DESCRIPTION OF THE RELATED ART

Conventionally, in portable information appliances such as imaging devices (for example, digital cameras) having an imaging function or the like, there are appliances which have a function of detecting positional information where the portable information appliance is situated, thereby processing the image data which is imaged so as to correspond to the detected positional information (for example, see JP-A-2004-15187).

However, for example, in such the above Patent Document, it is impossible for a user to easily obtain the information on a subject (e.g., a structure) which is imaged by a user.

An object according to aspects of the present invention is to provide an imaging device, an information acquisition system, and a program that enables a user activity to be enriched.

SUMMARY

An imaging device according to an aspect of the present invention includes an imaging portion which images a subject; a positional information acquisition portion which acquires positional information of an imaging position; a control portion which acquires information on the subject based on the positional information and displays image data of the subject and information on the subject on a display portion; and a hold control portion that outputs a hold control signal, which holds the image data of the subject and the information on the subject, to the control portion.

A imaging device according to an aspect of the present invention includes a latitude and longitude detection portion that detects latitude and longitude information of one's position; an azimuthal angle detection portion which detects an azimuthal angle by which image data is imaged; a control portion which acquires augmented reality information added to a structure situated in a latitude and longitude range of the azimuthal angle direction in the latitude and longitude information by the latitude and longitude information and the azimuthal angle, thereby displaying the augmented reality information on a display portion; and a hold control portion which outputs the hold control signal, which stores the augmented reality information and the image data in a memory portion, to the control portion upon detecting an action of storing the augmented reality information in the memory portion.

An information acquisition system according to an aspect of the present invention comprises an imaging device and an information retrieval system. The imaging device is the imaging device according to any one of the above-mentioned image devices.

An information acquisition system according to an aspect of the present invention is constituted by an imaging device and an information retrieval system, where the information retrieval system extracts a structure situated in a latitude and longitude range of a direction of the azimuthal angle in the latitude and longitude information by the latitude and longitude information and the azimuthal angle transmitted from the imaging device, thereby transmits the information added to the extracted structure to the imaging device. The imaging device includes a latitude and longitude detection portion which detects latitude and longitude information of one's position; an azimuthal angle detection portion which detects an azimuthal angle by which image data is imaged; a control portion which acquires augmented reality information added to a structure situated in a latitude and longitude range of the direction of the azimuthal angle in the latitude and longitude information by the latitude and longitude information and the azimuthal angle, thereby displays the same on a display portion; and a hold control portion which outputs the hold control signal, which stores the augmented reality information and the image data in a memory portion, to the control portion upon detecting an action that stores the augmented reality information in the memory portion. The information retrieval system includes a database in which map data, in which a structure identification number of a structure corresponds to latitude and longitude information of the structure, and a structure table, in which the structure identification number corresponds to the augmented reality information of the structure shown by the structure identification number, are stored; and an information retrieval server which retrieves the structure identification number of the structure situated in the latitude and longitude range of the direction of the azimuthal angle in the latitude and longitude information from the map data by the latitude and longitude information and the azimuthal angle transmitted from the imaging device, reads the augmented reality information added to the structure shown by the structure identification number from the structure table by the retrieved structure identification number, and transmits the augmented reality information of the read structure to the imaging device.

A program according to an aspect of the present invention is a program for executing the function of the imaging device described in any one of the above in a computer and comprises a step of inputting a positional information of a position having imaged a subject; a step of acquiring an information for the subject based on the positional information; a step of displaying an image data of the subject and the information for the subject on a display portion; and a step of outputting a control signal holding the image data of the subject and the information for the subject to the control portion.

A program according to an aspect of the present invention is a program for executing the function of the imaging device described in any one of the above in a computer, a step of inputting latitude and longitude information of one's position which is detected by a latitude and longitude detection portion; a stop of inputting an azimuthal angle imaging image data which is detected by an azimuthal angle detection portion; a step of acquiring augmented reality information added to a structure situated in a latitude and longitude range of the azimuthal angle direction in the latitude and longitude information by the latitude and longitude information and the azimuthal angle, thereby displaying the same on a display portion; and a step of outputting a hold control signal, which stores the augmented reality information and the image data in the memory portion, to the control portion upon detecting an action of storing the augmented reality information in a memory portion.

According to the aspects of the present invention, an imaging device, an information acquisition system and a program are provided that enables a user to be enriched.

BRIEF DESCRIPTION OF THE DRAWINGS

FIG. 2 is a conceptional diagram that shows a configuration example of a structure table stored in a database in FIG. 1.

DESCRIPTION

Figure 1:
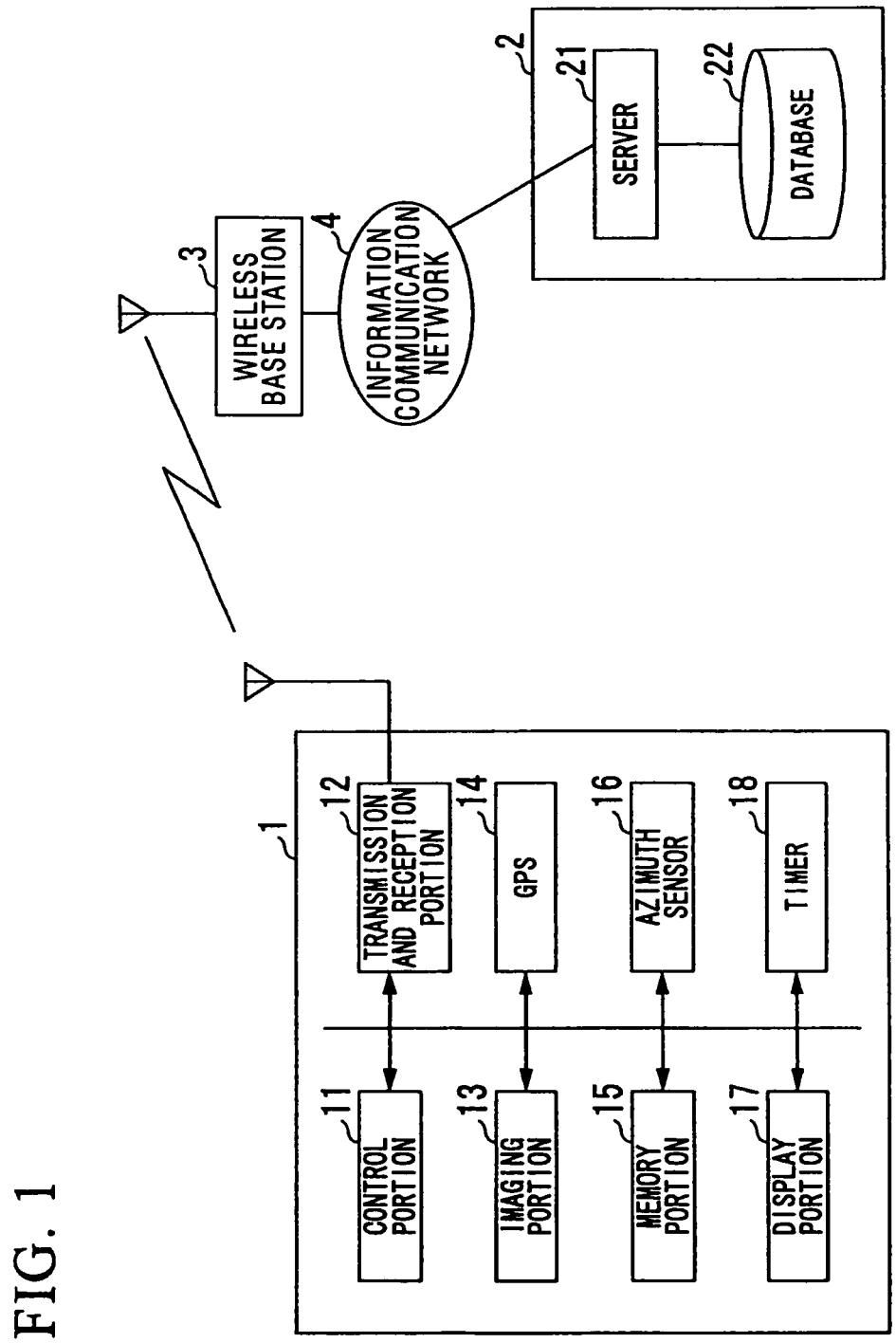
FIG. 1 is a block diagram that shows a configuration example of an information acquisition system according to an embodiment of the present invention.

Hereinafter, an imaging device and an information acquisition system according to an embodiment of the present invention will be described with reference to the drawings. FIG. 1 is a block diagram that shows a configuration example of an imaging device and an information acquisition system according to the present embodiment.

In FIG. 1, the information acquisition system includes a digital camera 1 which is an example of an imaging device, and an information retrieval system 2. The digital camera 1 performs the transmission and the reception of the data to the information retrieval system 2 (or an information retrieval server 21 described later) via a wireless base station 3 and an information communication network 4 such as the Internet by performing data communication with the wireless base station 3 by radio communication. In addition, the imaging device in the present embodiment is a portable terminal having an imaging function such as the aforementioned digital camera 1 or a mobile phone equipped with a camera. For example, the digital camera 1 has a browser function and has a control portion 11, a transmission and reception portion 12, an imaging portion 13, a OPS (Global Positioning System) 14, a memory portion 15, an azimuth sensor 16 (an azimuthal angle detection portion), a display portion 17, and a timer 18. Herein, the radio communication in the present embodiment does not use a line as a transmission line, but includes communication by radio wave, light, sound wave or the like.

The imaging portion 13 has a CCD (Charge-Coupled Device) or CMOS (Complementary Metal Oxide Semiconductor) image sensor, a lens or the like and outputs image data, which images the subject (a target to be imaged), to the control portion 11. In the following description, as an example, the subject in the present embodiment shows structures (commercial buildings including stores, public buildings such as schools and hospitals, factories, houses including apartments, artificial constructions such as steel towers, bridges, dams, amusement parks, and bronze statues, or the like). The GPS 14 (the positional information acquisition portion, the latitude and longitude detection portion) acquires the information of the latitude and the longitude (the latitude and longitude information, and the positional information) of the digital camera 1 and outputs the same to the control portion 11 when the control signal (for example, the control signal that is output by a peripheral circuit (not shown) which detects the push-down of an imaging button B1) instructing the imaging from a user, or the control signal (e.g., the control signal that is output by a peripheral circuit (not shown) which detects the selection of an icon by touching the icon (a sign) showing the retrieval or the like by a user) instructing that the information retrieval is input. In addition, the positional information acquisition portion (the latitude and longitude detection portion) in the present embodiment may be another configuration if the position of the imaging device 13 can be acquired and, for example, may acquire the positional information of the imaging device 13 using the wireless base station 3.

The azimuth sensor 16 (the azimuthal angle detection portion, the azimuthal information acquisition portion) includes an electronic compass or the like, detects the azimuth of the series direction where the CCD and the lens are arranged, for example, in series in the imaging portion 13 and outputs the same as azimuthal information to the control portion 11 when the control signal (e.g., the control signal that is output by a peripheral circuit (not shown) which detects the push-down of an imaging button B1) instructing the in from a user, or the control signal (e.g., the control signal that is output by a peripheral circuit (not shown) which detects the selection of an icon by touching the icon showing the retrieval or the like by a user) instructing the information retrieval is input. In addition, the azimuth sensor 16 may detect the azimuth of the direction (in other words, the imaging direction) of the subject viewed by a user and outputs the same to the control portion 11 as the azimuthal information. Herein, when the azimuthal angle is adopted as the azimuthal information, the azimuthal angles are represented as east (90°), south) (180°) and west (270°) in a clockwise direction based on north (0°) as units of degrees, minutes, and seconds, for example, by setting the latitude and the longitude of the positional information as the center point.

The control portion 11 gives the captured image data the image identification information when the control signal instructing the capturing such as pressing down the imaging button B1 by a user is input from a peripheral circuit (not shown), allows the image data imaged for each image identification information to correspond to the time data, the positional information and the azimuthal information acquired from the timer 18 and writes them on the memory portion 15 in the imaging order.

The display portion 17 displays the image data which is imaged by the imaging portion 13 or the image data that is selected as an image displayed by a user and is read from the memory portion 15 by the control portion 11.

Furthermore, as described later, the display portion 17 performs the display of the image data received from the information retrieval system 2 or the character data input by a user or the like, by the control of the control portion 11.

The transmission and reception portion 12 performs the transmission and the reception to the wireless base station 3 by the radio communication and performs the transmission and the reception of the image data, the character data or the data such as the control signal between it and the information retrieval system 2 via the information communication network 4.

Next, as shown in FIG. 1, the information retrieval system 2 has an information retrieval server 21 and a database 22. In addition, the database 22 may be provided in a memory medium (e.g., a memory, an HDD or the like) in the information retrieval server 21 and may be in an externally attached memory medium or a memory medium of another terminal.

As in the structure table shown in FIG. 2, in the database 22, a structure identification information for identifying the structure, a structure name that is a name of a structure, a structure information (information such as an address, a phone number, a type, and a peripheral image data around the structure), positional information by the latitude and the longitude of the structure, a structure description (information described by a store in the case of a store), and a submission information (a comment such as an evaluation of a visited user, image data submitted by a user or the like) are stored.

Furthermore, in the database 22, a map data is stored in which the latitude and the longitude are set as coordinate axis of a two-dimensional plane and the respective registered structures are arranged. In the map data, the respective structures are shown in the positions of the latitude and the longitude corresponding to the structure identification information.

The information retrieval server 21 explores the structure which is the nearest distance in a direction where the azimuthal information shows from a position of the latitude and the longitude which the positional information shows using the positional information and the azimuthal information to be input, and acquires the structure identification information of the explored structure.

Furthermore, the information retrieval server 21 retrieves the structure corresponding to the structure identification information of the explored and acquired structure from the structure table and transmits the respective information (the structure name, the structure information etc.) of the explored structure to the digital camera 1. In addition, the information retrieval server 21 may selectively transmit each piece of information of the structure to be transmitted to the digital camera 1, for example, depending on necessity such as the transmission and the reception data capacity. In that case, the information retrieval server 21 may transmit the rest of the information among the respective information of the structure to the digital camera 1 again by a predetermined operation (e.g., the request from the digital camera 1) or the like, <information Retrieval of Image Imaged by Digital Camera 1>

Figure 3:
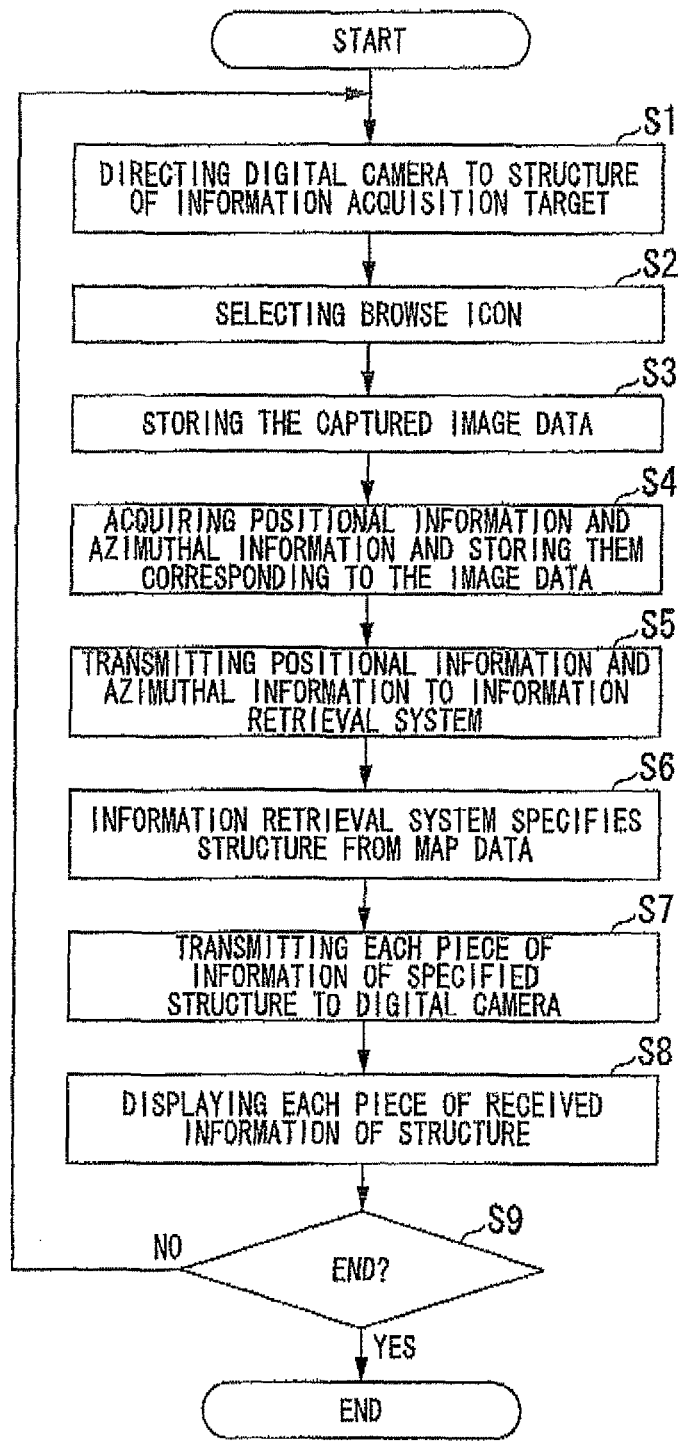
FIG. 3 is a flowchart that shows a flow of processing information retrieval of an image that is imaged by a digital camera.
Figure 4:
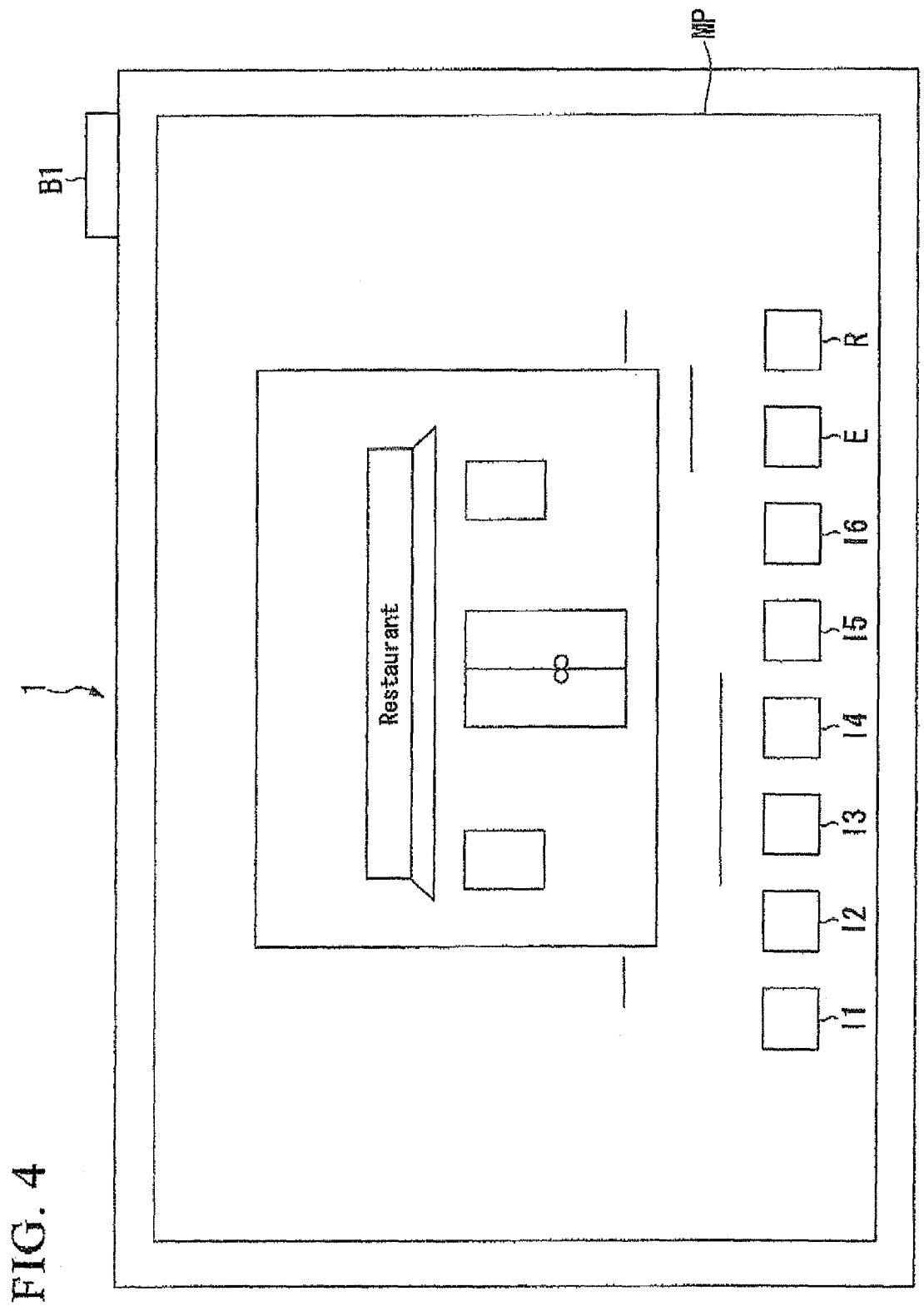
FIG. 4 is a conceptional diagram that shows a display image displayed on a digital camera.
Figure 5:
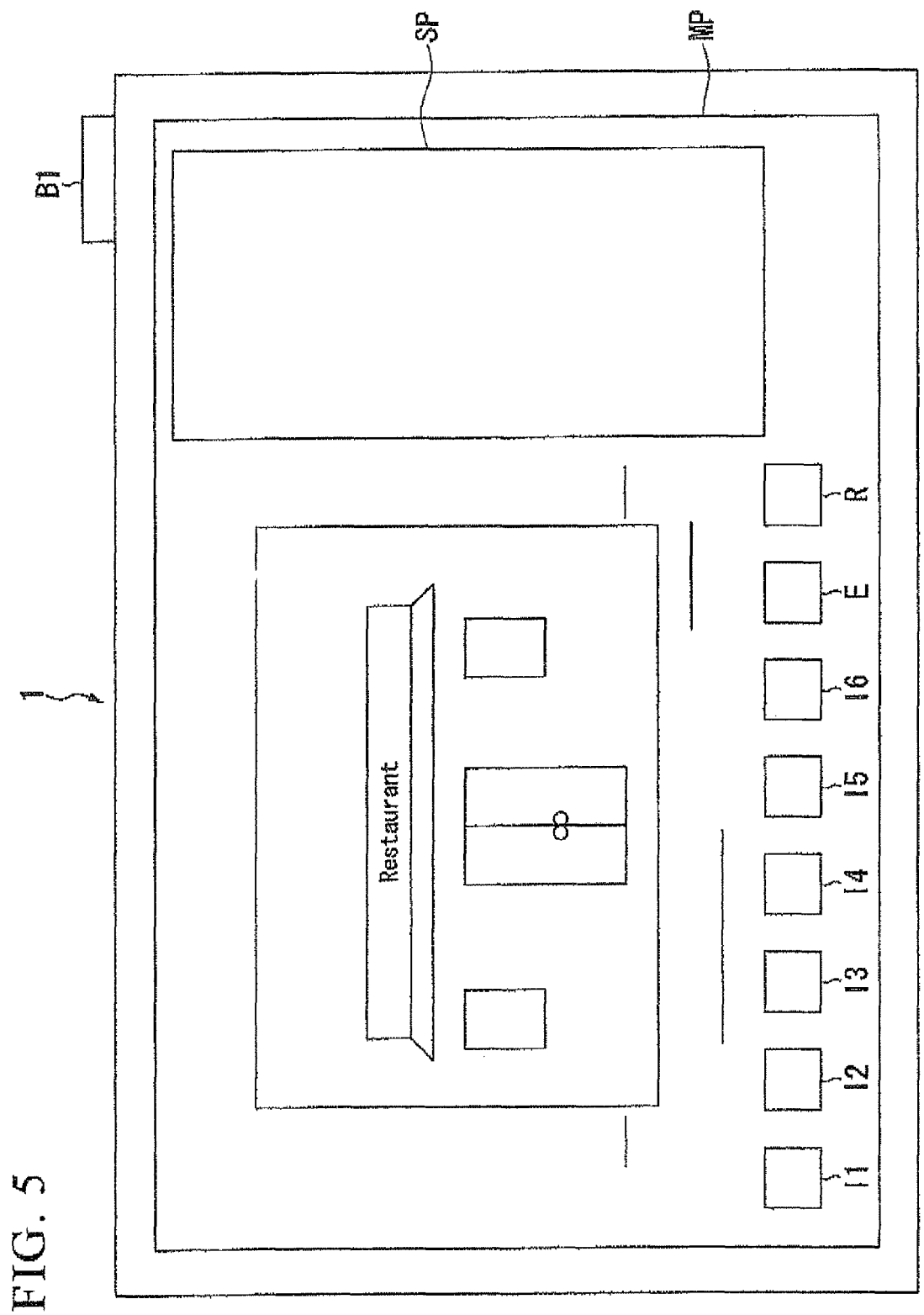
FIG. 5 is a conceptional diagram that shows a display image displayed on a digital camera.
Figure 6:
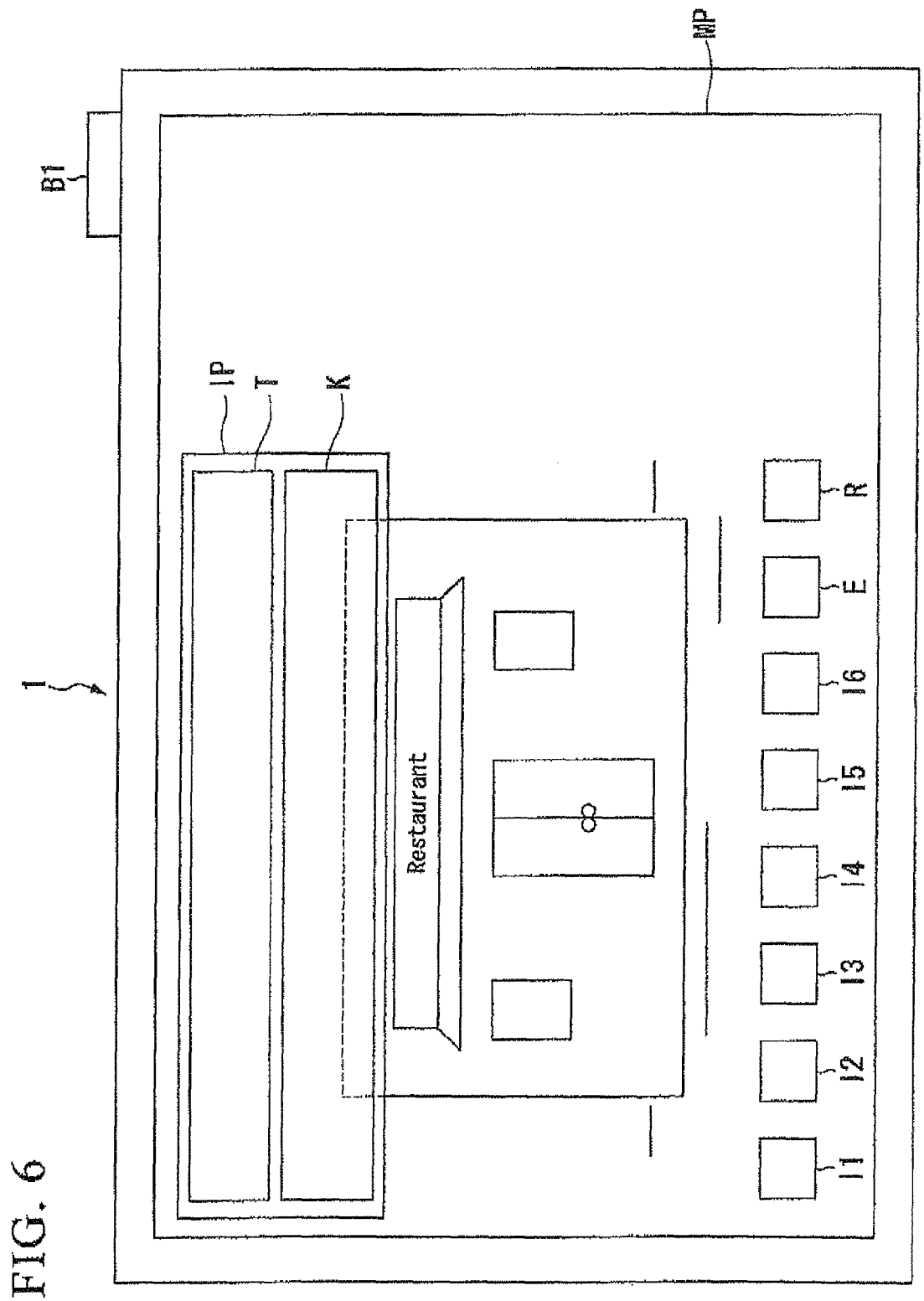
FIG. 6 is a conceptional diagram that shows a display image displayed on a digital camera.

Next, the operation of the present embodiment will be described using FIGS. 1, 3, and 4 to 6. FIG. 3 is a flowchart which shows an operational example of the information retrieval processing in the present embodiment of the case of performing the information retrieval in the state of imaging the digital camera 1 toward the structure. FIGS. 4 to 6 are diagrams that show arrangements of the screen displayed on the display portion 17 of the digital camera 1 and the imaging button B1 of the digital camera 1.

In the following description, for example, a state will be described in which a user explores a restaurant for dinner while walking along downtown.

A user directs the lens of the digital camera 1 to a restaurant of an appealing exterior while wandering downtown (step S1), when a restaurant of a favorite exterior in which an information wants to be obtained is found, as shown in FIG. 4, by touching (pressing down) a browse icon I1 provided in an image display column MP of the digital camera 1, the browse icon I1 is selected (step S2).

At this time, as shown in FIG. 4, in the imaging state, the control portion 11 displays the image data imaged by the imaging portion 13 which is input from the imaging portion 13, the image data of the restaurant, in the image display column MP via the display portion 17. In addition, the image display column MP (the image display portion) in the present embodiment is constituted by a touch panel (e.g., including a pressure sensitive type, an electrostatic type, a sound wave type or the like).

In addition, the above-mentioned step S2 may be configured so that, after pressing down the imaging button B1 of the digital camera 1, the browse icon I1 is touched and selected while viewing the image display column MP on which the image of the imaged restaurant is displayed.

The browse icon I1 is touched, whereby the signal, which shows that the browse icon I1 is selected, from a peripheral circuit (not shown) to the control portion 11 is output. Moreover, the control portion 11 detects the selection of the browse icon I1 by the inputting signal showing that the browse icon I1 is selected, gives the image data of the restaurant that is imaged by the imaging portion 13 the image identification information, allows the image data to correspond to the image identification information, writes the image data and the imaged time for the memory portion 15, and stores the image data (step S3).

Furthermore, when the browse icon I1 is touched, the control portion 11 allows the positional information acquired by the GPS 14 and the azimuthal information acquired by the azimuth sensor 16 to correspond to the image identification information as the related information, writes and stores them on the memory portion 15 (step S4).

Moreover, after writing the image data and the related information on the memory portion 15, the control portion 11 transmits a retrieval request signal including a camera identification information (an identification information given to a user or an identification information given to the digital camera 1) for identifying the digital camera 1, the positional information, and the azimuthal information to the information retrieval system 2 via the transmission and reception portion 12 (step S5). In addition, the control portion 11 may transmit the retrieval request signal to the information retrieval system 2 via the transmission and reception portion 12 without writing the image data, the related information or the like on the memory portion 15 in the above-mentioned steps S3 to S5.

Next, in the information retrieval system 2, when the retrieval request signal is received from the digital camera 1, the server 21 extracts the structure of the retrieval target from the map data of the database 22 based on the positional information and the azimuthal information included in the retrieval request signal. Moreover, the server 21 transmits the respective information in the table of the structure from the structure table of FIG. 2 by the structure identification information to the digital camera 1 as the retrieval result information including the structure identification information (step S7). At this time, as an example, the server 21 reads the address on the network of the digital camera 1 which is added when the retrieval request signal is transmitted from the digital camera 1 via the transmission and reception portion 12, and transmits the retrieval result information to the address.

In addition, in the above-mentioned step S7, the server 21 may extract the structure of the retrieval target from the map data of the database 22 based on the positional information and the azimuthal information included in the retrieval request signal, only when it is detected that the camera identification information included in the retrieval request signal is registered in a user registration table in the user registration table stored in the database 22. In this case, the server 21 may transmit, for example, the information on the need for the user registration based on the camera identification information to the digital camera 1, when it is detected that the camera identification information included in the retrieval request signal is not registered in the user registration table.

Moreover, in the digital camera 1, when the retrieval result information is received from the information retrieval system 2 via the transmission and reception portion 12, as shown in FIG. 5, the control portion 11 displays the building information on the information display column SP via the display portion 17 (step S8). For example, when the structure is a restaurant, information on the kind (Chinese, Japanese, French, Italian or the like) of restaurant, a phone number, an address of the restaurant or the like are displayed. In addition, the information display column SP shown in FIG. 5 is an example of the present embodiment, and a part of the information display column SP may be displayed on the image of the restaurant so as to be overlapped. Furthermore, the information display column SP is a part of the above-mentioned image display column MP and is displayed due to, for example, the above-mentioned browse icon I1, a CM icon I2 described later or the like is touched and selected.

Furthermore, when a user touches the CM icon I2, the peripheral circuit outputs the signal showing the section of the CM icon I2 to the control portion 11.

As a result, the control portion 11 detects the selection of the CM icon I2 by the input of the signal showing that the CM icon I2 is selected, and displays the commercial information (a menu, a seat number, an image in a store, today's recommendation dish of a chef or the like) of the restaurant contained in the retrieval result information on the information display column SP via the display portion 17. Furthermore, when the image data such as the image in the store is included in the commercial information, the control portion 11 displays the image data on the information display column SP.

Furthermore, when a user touches the submission reading icon I3, the peripheral circuit outputs the signal showing the selection of the submission reading icon I3 to the control portion 11.

As a result, the control portion 11 detects the selection of the submission reading icon I3 by the input of the signal showing that the submission reading icon I3 is selected, and displays the submission information (the comment) written by another user included in the retrieval result information on the information display column SP via the display portion 17. Moreover, when a plurality of submission information exists, the control portion 11 displays the plurality of submission information on the information display column SP, for example, in the submitted date order.

The image data is also included in the submission information, and, when the photographs of the respective dish imaged by another user or the internal image data of the store is included in the submission information, the control portion 11 displays the image data on the information display column SP via the display portion 17.

Moreover, for example, when the control portion 11 detects the signal showing that it is touched so as to be slid from the left end of the information display column SP toward the right direction in FIG. 5, the control portion 11 ends the display of the information display column SP and displays the image of the restaurant on the image display column MP via the display portion 17 as shown in FIG. 4. In addition, for example, when the control portion 11 detects the signal showing that the submission reading icon I3 is selected while the submission information is displayed on the information display column SP, the control portion 11 may end the display of the information display column SP or the display of the submission information.

Furthermore, for example, when displaying the commercial information (or the submission information) after displaying the building information on the information display column SP, the control portion 11 may display the commercial information simultaneously with the building information and may display the commercial information after erasing the building information from the information display column SP.

In addition, when the control portion 11 detects the signal showing that the image in the store or the like displayed on the information display column SP is touched, the control portion 11 displays the expansion image or the reduction image of the image in the store on the information display column SP (or the image display column MP).

Moreover, when a user touches a mail icon I4, the peripheral circuit outputs the signal showing the selection of the mail icon I4 to the control portion 11.

As a result, the control portion 11 detects the selection of the mail loon 14 by the input of the signal showing that the mail icon I4 is selected, and displays an input column IP shown in FIG. 6 on a part of the image display column MP via the display portion 17. Herein, the input column IP includes a text column T into which a user inputs the information or the like, and a touch screen type keyboard portion K. The input column IP is used when a user inputs submission information described later, a store name, a year or the like.

A user writes the submission information such as the dish they eat, the ambience in the store or the quality of the service of a waiter on the text column T of the input column IP using the touch screen type keyboard portion K. Moreover, a user touches the mail icon I4 again, whereby the control portion 11 detects the section of the mail icon I4, sets the character information described in the text column T and the image data displayed on the image display column P as the submission information together with the camera identification information and the structure identification information, and transmits the retrieval request signal including the submission information to the information retrieval system 2 via the transmission and reception portion 12.

Moreover, when receiving the retrieval request signal from the digital camera 1, the server 21 writes new submission information, which is input so as to correspond to the structure identification information, with respect to the submission column of the structure table of the database 22. In addition, before the submission information, which was written on the submission writing column (the text column T), is written on the submission column of the structure table of the database 22, the server 21 detects whether or not the camera identification information included in the retrieval request signal exists in the user registration table in the database 22, and only when it is detected that the camera identification information is registered, the submission information may be written on the submission column of the structure table of the database 22.

Next, the control portion 11 performs the detection whether or not an ending icon E is selected (step S9). Herein, when a user touches the ending icon E, the peripheral circuit outputs the signal showing the selection of the ending icon E to the control portion 11.

Moreover, if the control portion 11 detects the selection of the ending icon E by the input of the signal showing that the ending icon E is selected, then the control portion 11 ends the processing of the information retrieve.

Meanwhile, when the signal showing the selection of the ending icon E is not input and the control portion 11 does not detect the selection of the ending icon E, the control portion 11 returns the processing to step S1 and continues the imaging processing and the information retrieval processing of the digital camera 1.

Furthermore, when the browse icon I1 is selected, the control portion 11 may include the captured image data with respect to the retrieval request signal to be transmitted to the information retrieval system 2. Moreover, the server 21 compares the peripheral image data of the structure information retrieved from the structure table by the structure identification information of the structure extracted from the map data with the transmitted image data by the image identification, extracts the characteristic amount from the image data, compares the extracted amount with the characteristic amount of the stored peripheral image data, and may perform the determination whether or not it corresponds to the imaged structure by the detection whether or not the similarity is equal to or greater than a set numerical value.

At this time, when it is decided that, as the comparison result, the structure of the peripheral image data is not the same as the structure of the image data, the server 21 extracts the next structure, which is closest in distance, from the map data by the positional information and the azimuthal information, performs the comparison of the characteristic amounts again, and may perform the evaluation of the similarity between the capturing image data and the newly extracted peripheral image data of the structure.

In addition, similarly to the above-mentioned imaging button B1, the browse icon I1 in the present embodiment may be provided in the imaging device 1 as a browse button (not shown). In this case, the function of the browse button is the same as that of the above-mentioned browse icon I1. Furthermore, the imaging button B1 in the present embodiment may function as the browse button by operating a switch portion (not shown). In this case, the browse icon I1 or the browse button is unnecessary.

<Image Information Retrieval After Imaging by Digital Camera 1>

Figure 7:
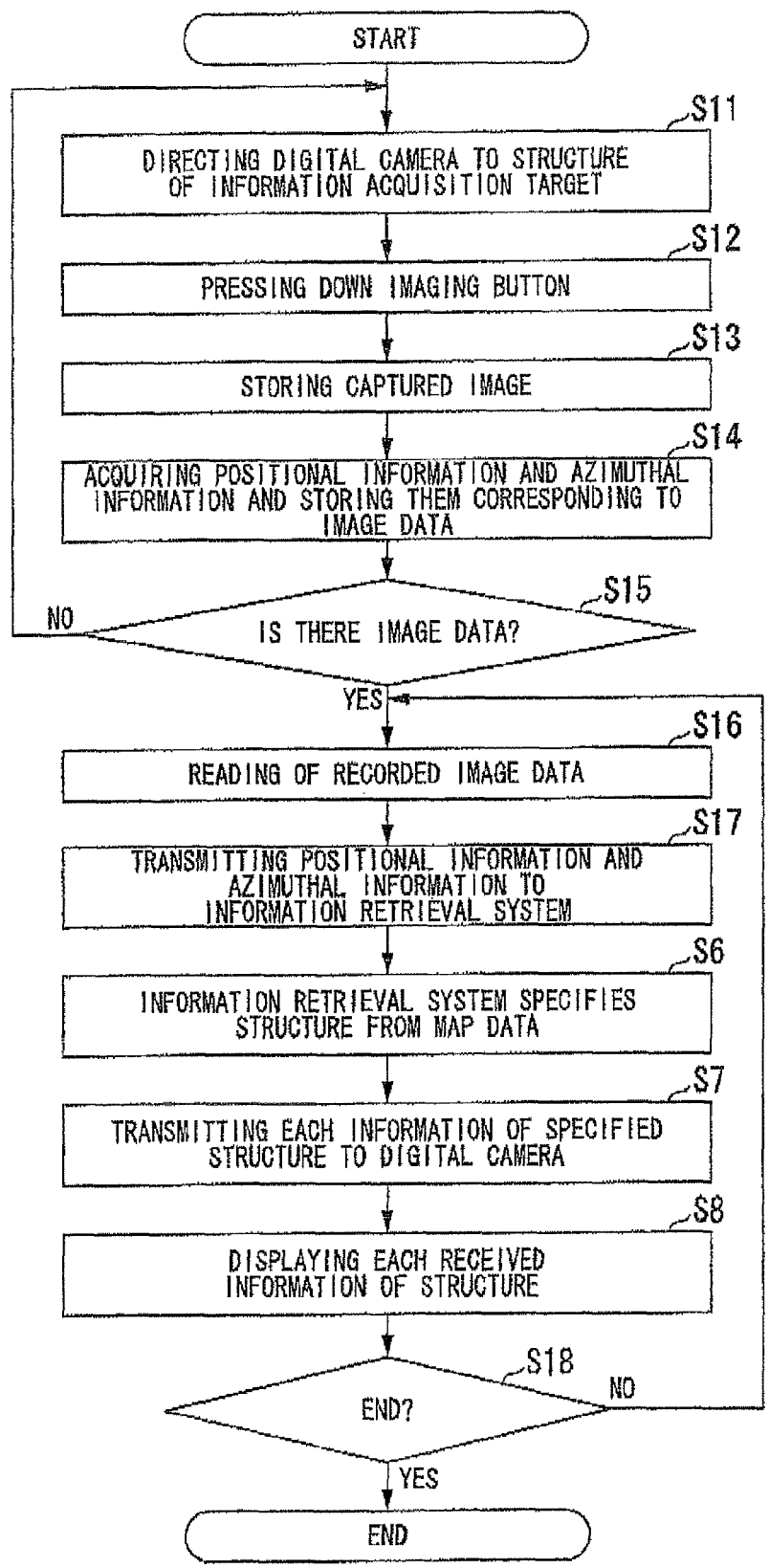
FIG. 7 is a flowchart that shows a flow of processing of an information retrieval of an image after being imaged by a digital camera.

Next, the operation of the present embodiment will be described using FIGS. 1, 7 and 4 to 6. FIG. 7 is a flowchart which shows an operational example of the information retrieval processing in the present embodiment in a case where, after the structure is imaged by the digital camera 1, the image data stored in the memory portion 15 is read and the information retrieval relative to the image data is performed.

In the following description, for example, an example is shown which shows a state in which a user retrieves a restaurant for dinner while wandering downtown Shinjuku, images the image data of some restaurants, and then finds the restaurant for dinner from amongst them.

A user directs the digital camera 1 with respect to the restaurant of an appealing exterior while wandering downtown (step S11), and when he finds the restaurant of the exterior desired to perform the information retrieval later, he presses down the imaging button B1 (the shutter) provided in the digital camera 1 (step S12). Herein, the control portion 11 displays the image data of the restaurant which images the capturing image data of the imaging portion 13 on the image display column MP of the display portion 17 as shown in FIG. 4.

Next, due to the imaging button B1 is pressed down by a user, the peripheral circuit outputs the signal showing the press-down of the imaging button to the control portion 11.

Moreover, the control portion 11 detects the press-down of the imaging button B1 by the input of the signal showing that the imaging button B1 is pressed down, gives the capturing image data of the restaurant of the imaging portion 13 the image identification information, allows the image data to correspond to the image identification information, and writes and stores the image data and the imaged time on the memory portion 15 (step S13).

Moreover, the control portion 11 allows the positional information acquired by the GPS 14 and the azimuthal information acquired by the azimuth sensor 16 to correspond to the image identification information at a point in time when the imaging button B1 is pressed down, and writes and stores the information on the memory portion 15 (step S14).

Next, when a user performs the information collection of the imaged restaurant, the user touches the reading icon R of the captured image. As a result, the peripheral circuit outputs the signal showing the selection of the reading icon R to the control portion 11. Herein, the control portion 11 performs the decision whether or not the image is stored in the memory portion 15 depending on whether or not the signal showing the selection of the reading icon R is input (step S15).

At this time, when the signal showing the selection of the reading icon R is input, the control portion 11 detects the selection of the reading icon R and progresses the processing to step S16 so as to start the retrieval of the information. In addition, the reading icon R may be a reading button (not shown). In that case, the reading button may be provided in the digital camera 1 main body, similarly to the imaging button B1. Meanwhile when the signal showing the selection of the reading icon R is not input or when the image is not stored in the memory portion 15, the control portion 11 returns the processing to the state in step S11 so as to perform a new imaging processing.

Moreover, when a user touches the reading icon R and the signal showing the selection of the reading icon R is input from the peripheral circuit, the control portion 11 sequentially reads the image data in a sequence which is imaged from the memory portion 15 in time series (step S16), and displays the image data on the image display column MP via the display portion 17 for each preset sheet (or for each image data) as a thumbnail image.

Furthermore, in a case where the thumbnail image does not completely enter one page (or in the case of displaying one by one), when a user touches the image displayed on the image display column MP so as to be slid in a predetermined direction, the thumbnail image of the prior page or the next page is displayed on the image display column MP. At this time, the control portion 11 displays the thumbnail image of the prior page or the next image on the image display column MP via the display portion 17 by detecting the signal that the image displayed on the image display column MP is touched so as to be slid in a predetermined direction.

Next, for example, when a user selects the image of the favorite restaurant from the thumbnail image by touching and touches the browse icon I1, the peripheral circuit outputs the signal showing the selection of the browse icon I1 together with the selected image identification information to the control portion 11.

As a result, when the signal showing the press-down of the browse icon I1 is input, the control portion 11 reads the positional information and the azimuthal information corresponding to the image identification information from the memory portion 15 by the image identification information of the selected image data, and transmits the retrieval request signal including the camera identification information, the positional information, and the azimuthal information to the information retrieval system 2 via the transmission and reception portion 12 (step S17).

Since the following processing of step S6 to step S8 are the same as that of step S6 to step S8 in FIG. 3, the description thereof will be omitted. Next, the control portion 11 performs the detection of whether or not the ending icon E is selected (step S18). At this time, when a user touches the ending icon E and the signal showing the selection of the ending icon E is input from the peripheral circuit, the control portion 11 finishes the processing of the browsing. Meanwhile, when the signal showing the selection of the ending icon E is not input, the control portion 11 returns the processing to step S16, and continues the selection processing of the image from the thumbnail image.

<Information Retrieval from Store Information Input in Digital Camera 1>

Figure 8:
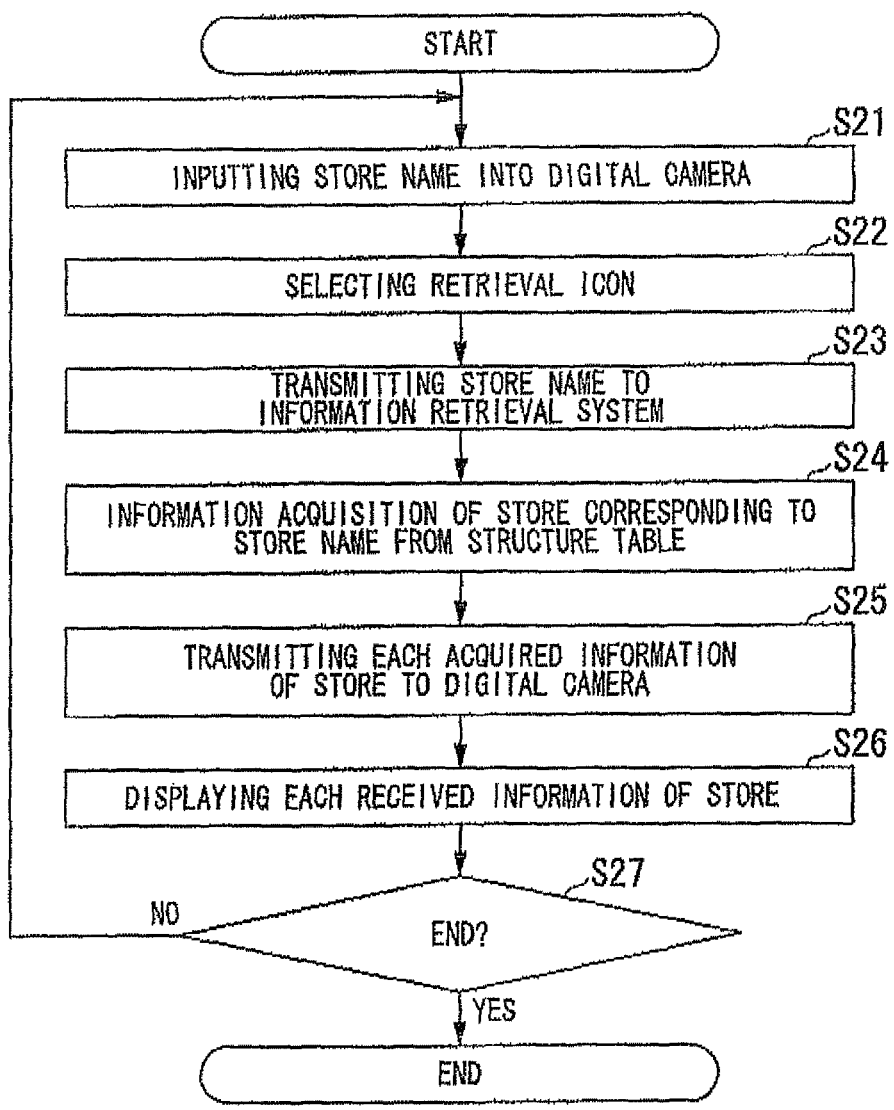
FIG. 8 is a flowchart that shows a flow of processing of an information retrieval from a shop information input to a digital camera.

Next, the operation of the present embodiment will be described using FIGS. 1 8 and 4 to 6. FIG. 8 is a flowchart which shows an operational example of the information retrieval processing in the present embodiment in a case where a user wants to perform the information retrieval of the restaurant or the like of the input store name from the structure table of FIG. 2 of the corresponding store name stored in the database 22, by inputting the store name in the digital camera 1.

In the following description, a state is shown in which, for example, in the case of having dinner in Harajuku, the information of the restaurant heard from an acquaintance is confirmed. When a user selects the retrieval icon I5 by touching, the peripheral circuit outputs the signal showing the selection of the retrieval icon I5 to the control portion 11.

As a result, the control portion 11 detects the selection of the retrieval icon I5 by the input of the signal showing that the retrieval icon I5 is selected, and displays the input column IP shown in FIG. 6 on a part of the image display column MP via the display portion 17.

Moreover, a user writes the store name of the restaurant desired to retrieve using the touch screen type keyboard portion K to the text column T of the input column IP (step S21), and the user touches the retrieval icon I5 again (step S22).

As a result, the peripheral circuit outputs the character data of the store name input in the text column T together with the signal showing the selection of the retrieval icon I5 to the control portion 11. Moreover, the control portion 11 detects the selection of the retrieval icon I5 by the input of the signal showing the selection of the retrieval icon I5, reads the character data input in the text column T, and transmits the retrieval request signal together with its camera identification information as the retrieval request signal to the information retrieval system 2 via the transmission and reception portion 12 (step S23).

Next, when the retrieval request signal is input, the server 21 reads the information (the store information, each information in the table of FIG. 2) of the structure (the store) corresponding to the store name from the structure table in the database 22 (step S24).

After reading the store information, the server 21 transmits the acquired store information to the digital camera 1 (step S25).

When the store information is received via the transmission and reception portion 12, the control portion 11 displays the image data around the store, which is included in the structure information, on the image display column MP of FIG. 5 via the display portion 17, and displays the building information on the information display column SP (step S26). For example, information on the type (Chinese, Japanese, French, Italian or the like) of the restaurant, the phone number or the like is displayed.

Furthermore, when a user selects the CM icon I2 by touching, the control portion 11 detects the selection of the CM icon I2, and displays the commercial information (a menu, today's recommended dish of a chef or the like) of the restaurant included in the retrieval result information on the information display column SP via the display portion 17.

Furthermore, when a user selects the submission reading icon I3 by touching, the peripheral circuit outputs the signal showing the selection of the submission reading icon I3 to the control portion 11.

The control portion 11 detects the selection of the submission reading icon I3 by the input of the signal showing that the submission reading icon I3 is selected, and displays the submission information written by another user included in the retrieval result information on the information display column SP via the display portion 17.

In addition, when a plurality of submission information exists, the control portion 11 sequentially displays the plurality of submission information on the information display column SP via the display portion 17. Furthermore, when the image data is also included in the submission information, the control portion 11 displays the image data on the information display column SP via the display portion 17.

Moreover, the control portion 11 performs the detection whether or not the ending icon E is selected (step S27). Since the detection of the selection of the ending icon E is the same as the processing of step S9 in <Information Retrieval of Image Imaged by Digital Camera 1> (in FIG. 3), the description thereof will be omitted.

At this time, when the signal showing the selection of the ending icon E is input from the peripheral circuit by touching the ending icon E by a user, the control portion 11 finishes the processing of the browsing. Meanwhile, when the signal showing the selection of the ending icon E is not input, the control portion 11 returns the processing to step S21 and continues the retrieval of the information of the store.

<Charging Processing Relative to Store Registered in Database 22>

When the above-mentioned structure is a store (including a restaurant or a company), the structure table of the database 22 may have a configuration in which the data of a discount coupon is stored for each store.

Moreover, the server 21 adds the discount coupon information to the retrieval result information and transmits the same to the digital camera 1.

When a user has dinner or shops using the discount coupon information, the server 21 detects whether or not a user has dinner or shops depending on the use of the discount coupon information. For example, when the discount coupon information is a bar code (including a two-dimensional bar code) or the like that is displayed on the information display column SP of the digital camera 1, a reader of a store reads the bar code and transmits the use information showing the use of the discount coupon information together with the camera identification information, which is transmitted from the digital camera 1, and a charge of the shopping (or a meal) to the information retrieval system 2.

As a result, when receiving the use information, the server 21 reads the history information corresponding to the camera identification information added to the use information from the database 22, and performs different charging with respect to the store used by a user in the using step of the information whether he visits the store by the information retrieval, uses the store by viewing the information provided by the store, or uses the store by viewing the submission information, that is as the information providing charge depending on the using degree of information of the database 22. Furthermore, the server 21 writes the step in which the information retrieval is performed, and the history of using the discount coupon information on a history table which is stored in the database 22 for each camera identification information.

The structure identification information showing a store is included in the bar code. In the database 22, a charging table is provided which stores the history of the charging corresponding to each store and the integrated value of the charging corresponding to the structure identification information.

Moreover, the server 21 corresponds to the structure identification information, writes the used sum and the charging corresponding to the using step of the information in the charging table as the history, and adds a new charging to the integrated value to perform the renewal of the integrated value.

<Addition Processing of Point Relative to User>

Whenever a user uses the discount coupon information in the store, the server 21 obtains a point (e.g., calculated by multiplying the point factor by the using amount) depending on the use amount when using the discount coupon information, and adds up the obtained points to correspond to the camera identification information in the user registration table in the database 22.

Furthermore, the server 21 adds up the points of a preset value in the user registration table to correspond to the camera identification information with respect to a user who transmits the submission information. The point can be used together with the discount coupon information instead of money in the payment.

<Display Sequence of Submission Information>

Herein, the server 21 may transmit a nickname and a title as the submission information together with the submission identification information in an initial step in the digital camera 1. Then, the control portion 11 initially displays only a plurality of nicknames and titles on the information display column SP. Then, a user touches and selects the appealing nickname and title submission information from the plurality of displays. As a result, the peripheral circuit transmits the signal showing the selection of the nickname and the title and the submission identification information of the selected submission information to the control portion 11.

As a result, the control portion 11 transmits the submission identification information and the submission information transmission request to the information retrieval system 2.

As a result, the server 21 transmits the character data and the image data (the whole submission information) corresponding to the transmitted submission identification information to the digital camera 1.

Herein, the server 21 gives the respective submission information the submission identification information for the identification, allows the information to correspond to the camera identification information, and writes and stores the information on the user registration table.

In addition, in the present embodiment, when the control portion 11 receives the character data and the image data from the information retrieval system 2 via the transmission and reception portion 12, the control portion 11 may display the character data on the information display column SP and may display the image data on the image display column MP.

Furthermore, in the user registration table, the server 21 retrieves the submission identification information corresponding to the referenced submission information from the user registration tables and increments the reference number of the camera identification information corresponding to the submission identification information.

Moreover, in the initial display step of the nickname and the title which allows a user to select the submission information, the server 21 transmits the display list to the digital camera 1 in a descending order of the selection count of the submission information, that is, the display list listed in a ranking order which the nickname and the title of the user having a larger reference count is higher rank in displaying on the information display column SP.

As a result, the control portion 11 sequentially displays the nickname and the title on the information display column SP according to the display list.

<Display Processing of Past Image Data>

Furthermore, in the present embodiment, the database 22 may have the previous image table in which the image data, in which the building and the scene in each of the latitude and the longitude are imaged for each year, is stored to correspond to the latitude and the longitude.

When a user selects the previous image icon I6 by touching, the peripheral circuit outputs the signal showing the selection of the previous image icon I6 to the control portion 11.

As a result, the control portion 11 detects the selection of the previous image icon I6 by the input of the signal showing that the previous image icon I6 is selected, and displays the input column IP shown in FIG. 6 on a part of the image display column MP via the display portion 17.

Furthermore, a user writes the year (e.g., year of Christian Era) on the text column T using a touch screen type keyboard portion K, and then touches the previous image icon I6 (or the browse icon I1).

As a result, the peripheral circuit transmits the character data of the year together with the signal showing the selection of the previous image data I6 to the control portion 11. When the signal showing the selection of the previous image data I6 is detected, the control portion 11 reads the character data showing the year that is written on the text column T.

After reading the data of the year, the control portion 11 transmits the previous image retrieval request together with the read year, the positional information, the azimuthal information, and the camera identification information to the information retrieval system 2.

Next, in the information retrieval system 2, the server 21 selects the previous image table corresponding to the latitude and the longitude based on the positional information of the structure received from the digital camera 1 displayed on the image display column P. Moreover, the server 21 reads the azimuthal information in the selected previous image table and the image data corresponding to the year, and transmits the read image data to the digital camera 1. The digital camera 1 displays the image data corresponding to the year, which is received from the server 21, on the image display column MP via the display portion 17. In addition, when there is the added information relative to the read image data, the server 21 also transmits that information together with the read image data to the digital camera 1.

As a result, a user can obtain the information on what structures existed for each past year or whether there was only a landscape or the like.

Herein, when the previous image table of the corresponding latitude and the longitude cannot be retrieved, the server 21 retrieves the previous image table of the latitude and the longitude which is in a direction of the azimuthal information and is mostly near the corresponding latitude and longitude, and performs the extraction of the image data therefrom.

Furthermore, if the year for retrieval is a period where photography did not exist, a landscape drawn at that period or the image data of a CG (Computer Graphics) imaginarily made may be stored in the previous image table of the memory portion 15 to correspond to the year instead of the image data of the photograph.

<Display Processing of AR (Augmented Reality) Information>

As mentioned above, in the configuration of FIG. 1, the control portion 11 writes the latitude and longitude information (the positional information) which shows the existence position of the digital camera 1 itself obtained from the GPS 14, the azimuthal information including the azimuthal angle showing a direction (the imaging direction) of the optical axis of the digital camera 1 obtained from the azimuth sensor 16 (the azimuthal angle detection portion) or the like on the memory portion 15 in an imaging sequence while adding the image identification information to the image data in which the imaging portion 16 images the subject.

Figure 9:
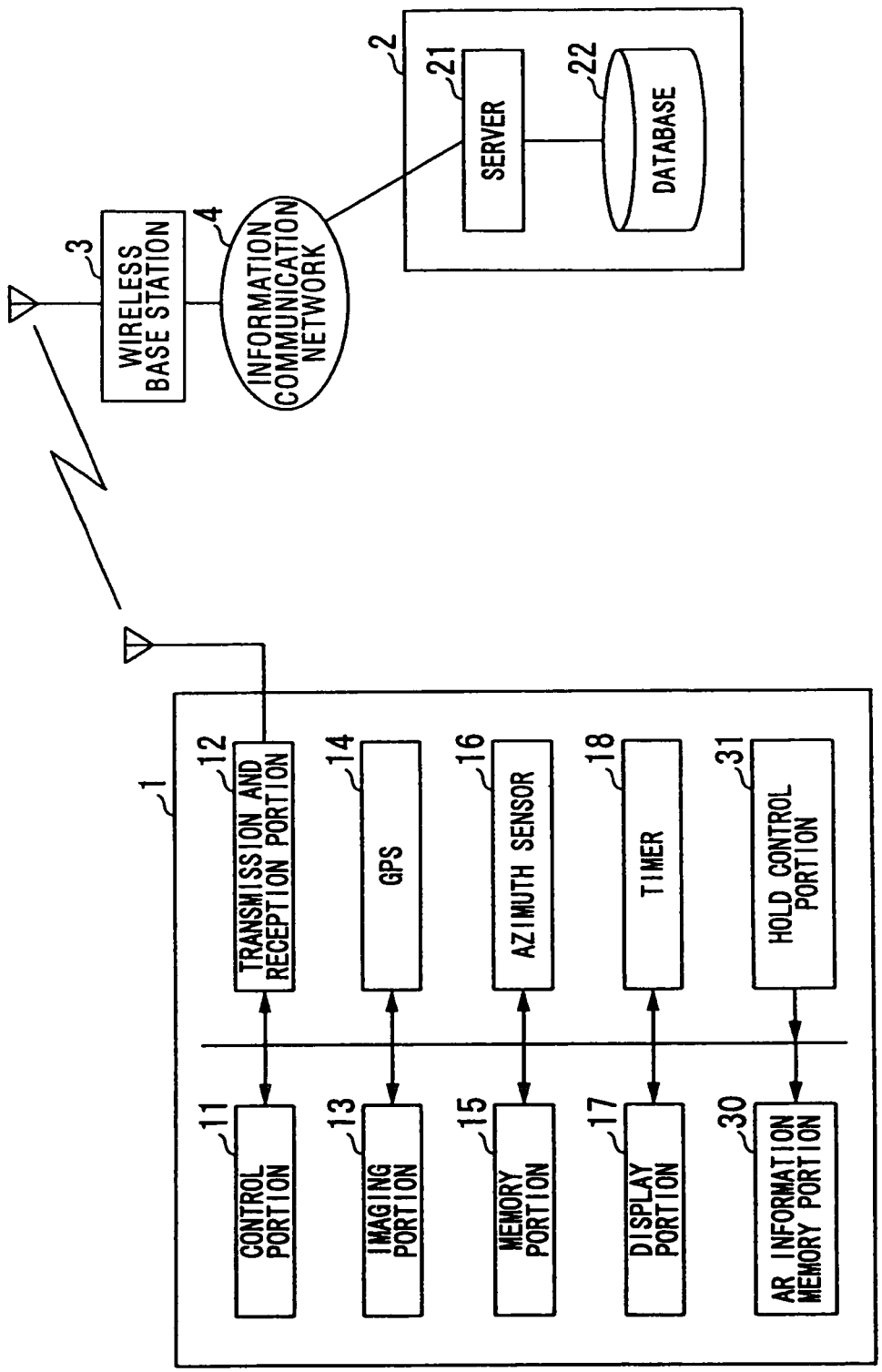
FIG. 9 is a block diagram that shows an information acquisition system having a function of acquiring and storing an AR (Augmented Reality) information.

As shown in FIG. 9, in the configuration of FIG. 1, as a function for the acquisition and the memory of the augmented reality information (AR information), a hold control portion 31 and an AR information memory portion 30 are newly added. FIG. 9 is a block diagram that shows a configuration example of an information acquisition system having a function of acquiring and storing the AR information.

The AR information in the present embodiment shows various information (information on the subject) shown in the building table shown in FIG. 2. For example, the AR information includes a structure identification information for identifying the structure, a structure name that is a name of a structure, a structure information (information such as an address, a phone number, a type, and a peripheral image data around a structure), a positional information by the latitude, the longitude or the like of the structure, a description of a structure (if a structure is a store, information described by the store), a submission information (comment of the evaluation or the like of a visited user, the comment of a user, the submitted image data of the user or the like) or the like. Herein, the building identification information may be a URL that shows where the information of the building is stored.

That which the control portion 11 makes any one of the AR information as a tag (object of an augmented reality) which displays to be overlapped with the image data of a through image (the image in which the subject is imaged) may be configured so as to be arbitrarily set by a user.

Herein, the through image is image data in which the imaging portion 13 continuously outputs the image imaged on the imaging element to the control portion 11 as the image data and the control portion 11 sequentially displays the same on the display portion 17.

The hold control portion 31 detects an action requiring the hold of the AR information. That is, the hold control portion 31 detects the timing of the hold which stores the image data, which is imaged on an element such as a CCD by the imaging portion 13 and is displayed on the display portion 17, and the AR information which is in the image data (which is in an angle of view of the image), on the AR information memory portion 30. In addition, the AR information memory portion 30 may be provided in the information retrieval system 2.

Herein, the control portion 13 stores the table showing the correspondence between the focus distance, the magnification or the like and the angle of view on the memory portion 15 in advance and obtains the angle of view information of the image by the focus distance, the magnification or the like when acquiring the image data.

Figure 10:
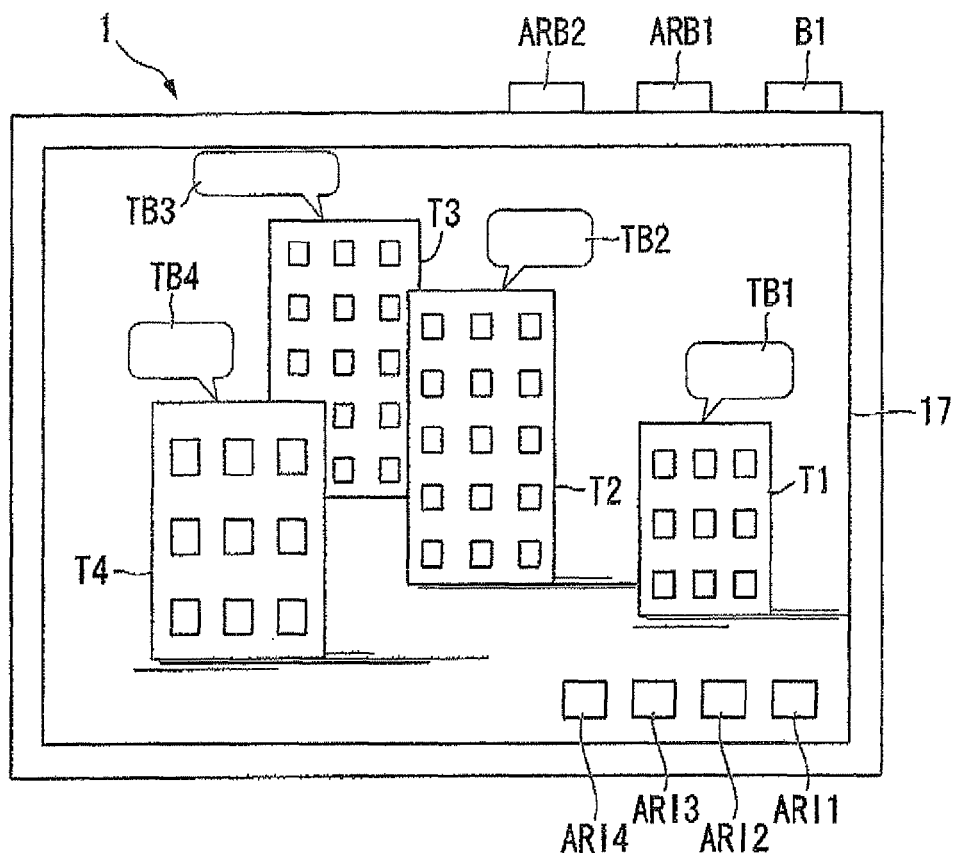
FIG. 10 is a diagram that shows a composition image in a display portion of a real image of buildings and images of tags (imaginary description) on which each of the augmented reality information (AR information) of the buildings is described.

FIG. 10 is a diagram that shows a composition image (AR image) on the display portion 17 of a real image (a through image) of the buildings T1 to T4 and the image of the tags (e.g., the tag in which the structure information as the augmented reality is described) TB1, TB2, TB3 and TB4 as the object of the augmented reality in which the respective AR information of the buildings T1 to T4 is described.

Furthermore, the digital camera 1 in the present embodiment has an AR information acquisition mode acquiring the AR information or a common imaging mode. The control portion 11 performs a control which detects the press-down of the button by the signal from the switch or detects the touch of the icon on the display portion 17 by the touch sensor, by pressing down the button (the AR information acquisition button ARB1) of the AR information acquisition mode provided in the case of the digital camera 1 or touching the icon (the AR information acquisition icon ARI1) of the AR information acquisition mode displayed on the display portion 17, thereby setting either the AR information acquisition mode or the common imaging mode.

Moreover, in the case of the AR information acquisition mode, the digital camera 1 in the present embodiment has a mode (an AR display mode) that displays (composites the image data and the object of the augmented reality of the AR information) the AR information as the tag or a mode (an AR non-display mode) that sets as non-display (displaying only the image data). The control portion 11 performs a control which detects the press-down of the button or the touch of the icon by the sensor, by the signal from the switch by the press-down of the display/non-display button (the AR switching button ARB2) provided in the ease of the digital camera 1, or the touch of the display/non-display button icon (the AR switching icon ARI2) displayed on the display portion 17, thereby setting any one of the display or non-display.

Herein, in the display portion 17, a transparent touch sensor is provided on the display element. When touching the icon, the touch sensor is touched, whereby the coordinate value of the touched area is transmitted to the control portion 11 as the detection signal. The control portion 11 matches the coordinate of the touch sensor with the coordinate of the display element to be displayed and can decide (the icon displayed on the display portion 17 shows the starting of the application or identifies the image identification information of the image data displayed as the thumbnail image or the like) the displayed image by the coordinate value of the detection signal.

Whenever the azimuthal angle (the azimuthal information) of the digital camera 1 is changed, the control portion 11 transmits the latitude and longitude information (the positional information), an azimuthal information and an angle of view information which image the image data displayed on the display portion 17 upon being held, together with the AR information acquisition request to the information retrieval system 2 via the transmission and reception portion 12. In addition, the control portion 11 may transmit the positional information and the AR information acquisition request to the information retrieval system 2 via the transmission and reception portion 12 periodically or by the instruction of a user and acquire the AR information. Furthermore, the control portion 11 may transmit the image data and the AR information acquisition request held by the hold control portion 31 to the information retrieval system 2 via the transmission and reception portion 12 periodically or by the instruction of a user and acquire the AP information.

Herein, the control portion 11 detects the azimuthal angle for each predetermined period, and when the azimuthal angle is changed beyond a preset angle from the azimuthal angle, which is stored in the azimuthal angle memory portion of the memory portion 15 in advance, detects the change as a change in azimuthal angle, and newly stores the azimuthal angle of this point in time in the azimuthal angle memory portion.

When the AR information acquisition request is received from the digital camera 1, the information retrieval server 21 obtains the retrieval distance from the coordinate position of the latitude and the longitude shown by the latitude and longitude information obtained from the angle of view information to the coordinate position of the latitude and the longitude that retrieves the AR information, based on the latitude and longitude information, the azimuthal information and the angle of view information which are added to the AR information acquisition request.

Furthermore, the information retrieval server 21 obtains the retrieval distance of the AR information by reading the retrieval distance corresponding to the angle of view information from the retrieval distance table of the database 22 in which the angle of view and the retrieval distance corresponding to the angel of view are described.

Figure 12:
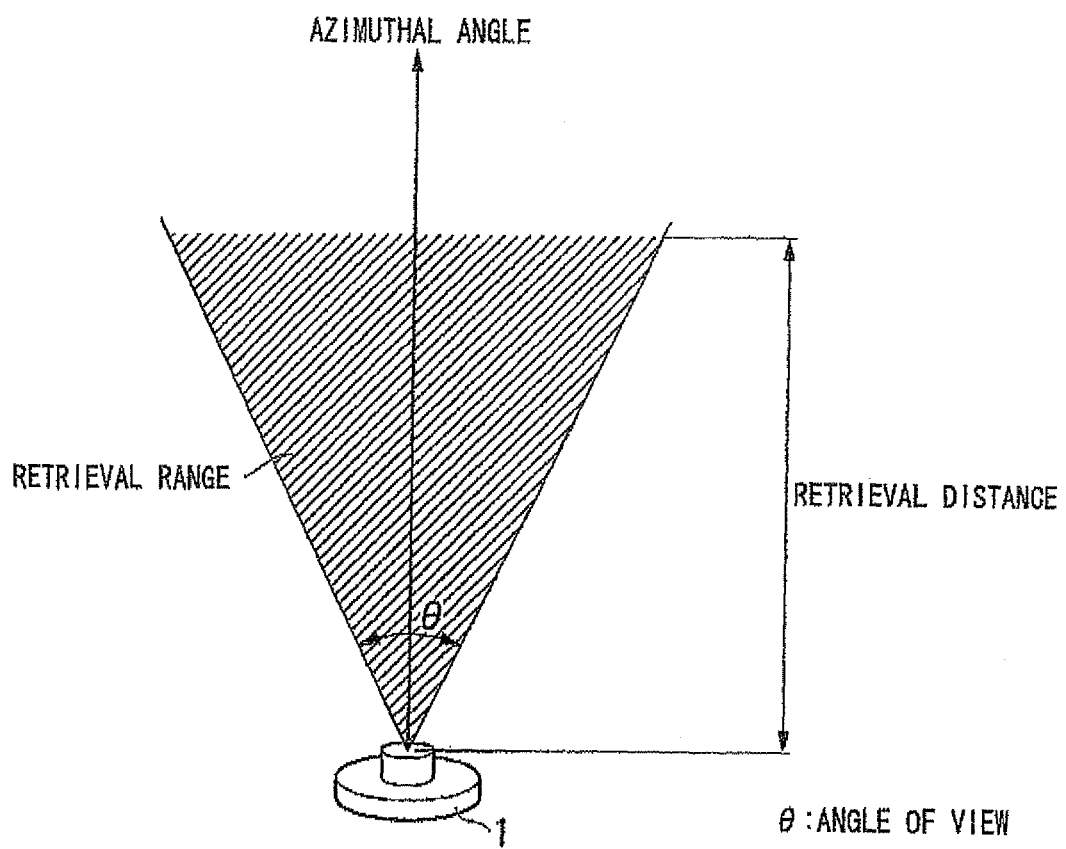
FIG. 12 is a diagram that shows a retrieval range which retrieves the AR information of the structure.

FIG. 12 is a diagram that shows a retrieval range that retrieves the AR information of the structure.

Moreover, the information retrieval server 21 obtains the retrieval range shown in FIG. 12 by the coordinate position based on the latitude and longitude information, the azimuthal angle of the optical axis of the lens of the digital camera 1, and the retrieval distance, and reads the structure identification information, which is in the retrieval range, from the map data of the database 22.

Furthermore, the information retrieval server 21 reads the AR information of the structure from the structure table in the database 22 by the read structure identification information.

The information retrieval server 21 transmits the read AR information together with the corresponding structure identification information to the digital camera 1.

As a result, the control portion 11 matches the coordinate value based on the latitude and longitude information of the digital camera 1 to the coordinate value based on the latitude and longitude information shown by the latitude and longitude information included in the AR information, overlaps and composes the image of the tag (the object of the augmented reality) of the AR information with the image data (the through image), and displays the same on the display portion 17 in the state shown in FIG. 10.

Furthermore, when the hold control signal is received from the hold control portion 31, the control portion 11 performs the processing of recording the latitude and longitude information upon being held, the azimuthal information and the angle of view information, the AR information transmitted from the information retrieval system 2 by the AR information acquisition request, and the structure identification information which identifies the structure of the AR information on the AR information memory portion 30 for each image identification information of the image data upon being held.

Figure 11:
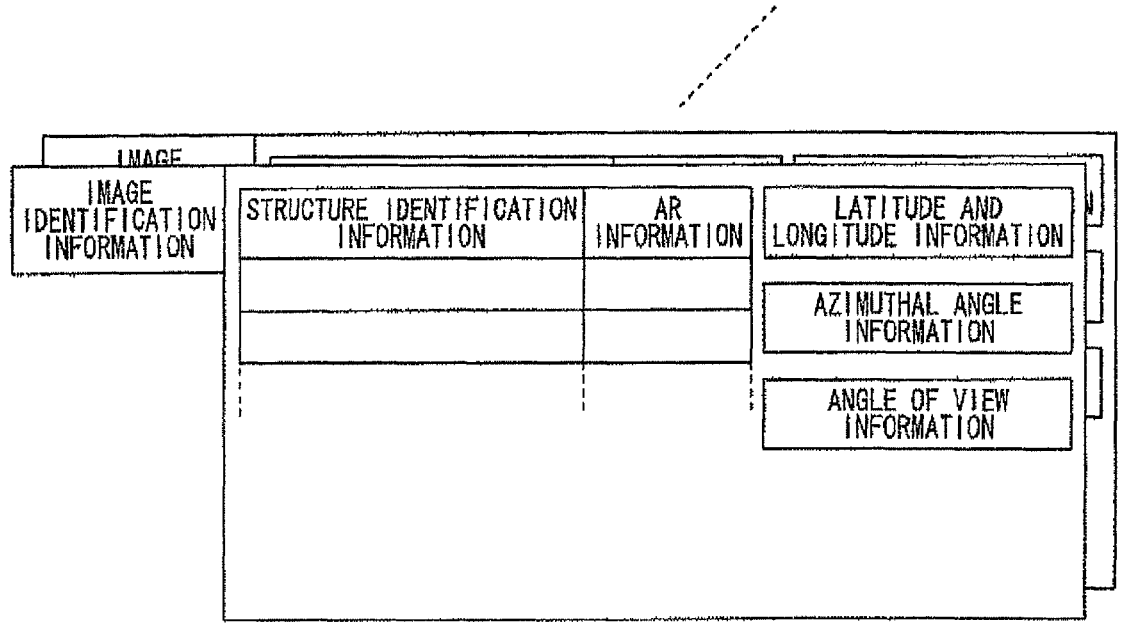
FIG. 11 is a diagram that shows an AR information table stored in an AR information memory portion in FIG. 9.

FIG. 11 is a diagram that shows a configuration of the AR information table stored in the AR information memory portion 30 in FIG. 9. The AR information table is stored in the AR information memory portion 30 for each piece of image identification information.

As described above, the control portion 11 is created for each image identification information, and writes and stores the structure identification information (URL showing the place where the AR information of the structure is stored), the AR information (including the latitude and longitude information) of the structure, the latitude and longitude information of the digital camera 1 itself when the hold control signal is input and it is held, the azimuthal information, and the angle of view information with respect to the AR information memory portion 30 as the AR information table.

Furthermore, when the hold control signal is input, the control portion 11 writes and stores the image data, which is imaged in the imaging element of the imaging portion 13 at that time, on the memory portion 15 to correspond to the image identification information given to the image data.

Herein, as an action of the input for instructing the hold of the AR information, the hold control portion 31 has a detection unit which detects the signal from the switch by the press-down of the AR information acquisition button ARB1 provided in the case of the digital camera 1, a detection unit by which the touch sensor detects the touching of the icon (the AR information acquisition icon ARI1) showing the AR information acquisition displayed on the display portion 17 or the like.

Moreover, when the AR information acquisition button is pressed down, or when the icon showing the AR information acquisition is touched, the hold control portion 31 detects the input of the signal for recording the image data and the AR information, and outputs the hold control signal performing the hold control to the control portion 1. In this manner, the hold control portion 31 detects the input of the image data and the signal for recording the AR information by a motion (action, operation, movement) of a user with respect to the digital camera 1, and outputs the hold control signal performing the hold control to the control portion 1.

Furthermore, the hold control portion 31 may detect that the digital camera 1 is rapidly moved (in order to easily view the screen, the digital camera 1 is directed downward and vibrated or the like) by an acceleration sensor as an action of holding the AR information, and set the detection timing to the timing of the hold.

In the acceleration detection using the acceleration sensor, when the acceleration data of more than a predetermined threshold value is supplied from the acceleration sensor and the hold control portion 31 outputs the hold control signal as the control signal of the hold instruction to the control portion 11. In this manner, the hold control portion 31 detects the input of the image data and the signal for recording the AR information by the motion of a terminal (e.g., the digital camera 1), and outputs the hold control signal performing the hold control to the control portion 1.

Furthermore, for example, as the action of holding the AR information, the hold control portion 31 detects the characteristic point of the image and detects by whether the characteristic point moves in the preset distance in the time of the preset detection range, or detects a change in image pattern in the image data by the change of the contrast of the output image data of the imaging element beyond a preset difference, and sets the detection timing to the timing of the hold.

In the detection of the change in image pattern, when the change of the image pattern, which is equal to or greater than the predetermined threshold value, is detected, the hold control portion 31 outputs the hold control signal as the control signal performing the hold control to the control portion 11.

Moreover, for example, the hold control portion 31 may detect that an angle of the digital camera 1 is rapidly changed (moved by the operation that, in order to easily view the screen, the digital camera 1 is directed downward or moved by the vibration or the like) using an elevation sensor as the action of holding the AR information and set the detection timing to the timing of the hold.

In the detection of the elevation information using the elevation sensor, when the elevation change, which is equal to or greater than the preset threshold value, is supplied from the elevation sensor, the hold control portion 31 outputs the hold control signal as the control signal performing the hold control to the control portion 11. In this manner, the hold control portion 31 detects the input of the signal for recording the image data and the AR information by the motion of the terminal (e.g., the digital camera 1) and outputs the hold control signal performing the hold control to the control portion 11.

Furthermore, in the case of the action of instructing of the hold using the abovementioned acceleration, sensor, a change in image pattern and the elevation sensor, in order to acquire the AR information corresponding to the image data when the hold control signal is received, the control portion 11 needs to store the image data obtained for each AR information acquisition request, the structure identification information corresponding to the image data, the AR information of the structure, the latitude and longitude information, the azimuthal information, and the angle of view information in the buffer portion of the AR information memory portion 30 in a predetermined time, for example, during one second.

For this reason, the control portion 11 writes and stores (cashes) the image data and the structure identification information corresponding to the image data corresponding to the AR information acquisition request, and the AR information of the structure, the latitude and longitude information, the azimuthal information and the angle of view information in the buffer portion of the AR information memory portion 30 in a predetermined time, for example, during one second.

Moreover, when the hold control signal is input, immediately before receiving the hold control signal or at the time of AR information acquisition request before the preset time, the control portion 11 writes and stores the image data which is obtained from the information retrieval system 2, stored in the buffer portion, and obtained for each AR information acquisition request corresponding to the image identification information, the structure identification information corresponding to the image data, the AR information of the structure, the latitude and longitude information, the azimuthal information and the angle of view information in the AR information memory portion 30, as the AR information table added with the time information.

Furthermore, the control portion 11 writes and stores the image data together with the image identification information on the memory portion 15.

Moreover, even when the non-display mode setting the AR display as the non-display is set, the control portion 11 and the hold control portion 31 may perform the acquisition of the AR information or the hold processing of the AR information.

When the AR information of the held image is displayed by the above-mentioned processing, the control portion 11 compares the time information with the internal clock from the AR information table stored in the AR information memory portion 30 by the instruction signal based on the press-down of the button (the AR switching button ARB2) of the AR display continuation provided in the case of the digital camera 1, or the instruction signal based on the touch of the icon (the AR switching button ARI2) of the AR display confirmation displayed on the display portion 17, selects and reads the AR information table of the latest time from the AR information memory portion 15, and displays the image data together with the tag of the AR information on the display portion 17, similarly to upon being transmitted from the information retrieval system 2. In addition, the control portion 11 may periodically acquire the AR information table of the latest time from the information retrieval server 21 and may acquire the AR information table of the latest time from the information retrieval server 21 based on the instruction signal. Moreover, in the case of the AR information acquisition mode, the control portion 11 may display the AR information of the held image by receiving the hold control signal upon being held.

Furthermore, the control portion 11 may read the image data corresponding to the image identification information stored in the AR information memory portion 30 from the memory portion 15 and display the thumbnail image of the read image data on the display portion 17. The control portion 11 may be configured so as to select the image data by touching the thumbnail image displayed on the display portion 17 by a user. The control portion 11 reads the AR information table of the image identification information from the AR information memory portion 30 by the image identification information corresponding to the selected thumbnail image, thereby performing the display relative to the display portion 17.

At this time, as mentioned above, a user can select the display/non-display of the AR information.

Herein, if the control portion 11 stores all of, the structure identification information for identifying the structure, the structure name that is the name of the structure, the structure information, the positional information by the latitude, the longitude or the like of the structure, the description of the structure, and the submission information, which are described in the structure table as the AR information, on the memory portion 15 or the like, even in a place where the wireless does not communicate with the wireless base station 3, that is, even in the case of being off-line, the control portion 11 can add the tag of the AR information to the image data stored in the AR information memory portion 30, as shown in FIG. 10 and can display the image data on the display portion 17.

Furthermore, if it is not used while off-line, the control portion 11 stores the latitude and longitude information of the digital camera 1, the azimuthal angle information, and the angle of view information which are necessary for the AR information acquisition request as the AR information table, and when the image data is selected, the control portion 11 may perform the AR information acquisition request with respect to the information retrieval system again.

By the above-mentioned configuration, even when a user does not direct the imaging direction of the digital camera 1 in a direction wanted to obtain the AR information, for example, even in a state in which the screen of the display portion 17 is viewed with mounting the digital camera 1 on the table, it is possible to confirm the AR information while viewing the image data of a direction wanted to obtain the AR information.

Furthermore, in the case of the AR information acquisition mode, when the hold control signal is received from the hold control portion 31, the control portion 11 displays the display to prompt the input of the user ID and the icon on which the keys of the alphabet and numbers are shown together with the user ID fill-up column.

A user touches the icon on which the keys of the alphabet and numbers are shown, whereby the control portion 11 detects the corresponding character data writes the same in the internal buffer, and displays the character data of the internal buffer in the user ID fill-up column.

Moreover, the control portion 11 fixes the character row of the internal buffer as the user ID by detecting the touch of the enter key that is in the icon on which the keys of the alphabet and numbers are shown.

The control portion 11 adds and stores the user ID, which is stored in the internal buffer, in the AR information table.

When a user tries to refer the AR information, if the image data is selected, the control portion 11 displays the user ID fill-up column together with the display of prompting the input of the user ID and the icon on which the keys of the alphabet and numbers are shown.

By detecting the touch of the icon on which the keys of the alphabet and numbers are shown, the control portion 11 detects and writes the corresponding character data on the internal buffer, and displays the character data of the internal buffer in the user ID fill-up column.

Moreover, by detecting the touching of the enter key which is in the icon in which the keys of the alphabet and numbers are shown, the control portion 11 compares the user ID corresponding to the character row of the internal buffer with the user ID added to the AR information table corresponding to the image identification information of the selected image data.

When the input user ID of a user is identical to the user ID added to the AR information table, the control portion 11 displays the composition image (the AR image) of the image data and the AR information on the display portion 17, and on the other hand, when the input user ID is different from the user ID added to the AR information table, the control portion 11 displays only the image data.

By the configuration, the digital camera 1 can specify the user (or the user ID) for each image and can perform the display of the AR information.

Furthermore, when the AR information registered on the information retrieval system 2 by another user or the AR information acquired by another user is not displayed but a user wants to display the AR information registered by oneself or the AR information acquired by oneself, the control portion 11 houses a user who uses the digital camera 1 like an address book as the user table on the memory portion 15 or the database 22 in advance, and when the icon (the AR switching icon ARI2) to be referring the AR information is touched, the control portion 11 displays the list (or the list of the user ID) of the user name acquired from the user table on the display portion 17.

Moreover, when a user touches their user ID from the list, the control portion 11 may read the AR information table, in which the same user as the touched user ID is added, from the AR information memory portion 31, read the image data having the same image identification information as that of the AR information table from the memory portion 15 and displays the image data on the display portion 17 as the thumbnail image. In addition, in the state in which the list is displayed, the control portion 11 may read the AR information table, in which the same user as the user ID of another user is added, from the AR information memory portion 30 based on the signal that another user is selected, read the image data having the same image identification information as that of the AR information table from the memory portion 15, and display the imaged data on the display portion 17 as the thumbnail image.

Furthermore, when the AR information table for each image identification information is stored in the AR information memory portion 30, the control portion 11 may add the AR information received from the information retrieval system 2 as well as the parameter or the imaging date and time (the time information) connected to the AR information as the AR related information with respect to the AR information, and store them on the AR information table to correspond to the respective structure identification information.

In this manner, for example, when a user displays the image data often years ago, the AR information and the AR related information on the display portion 17, upon pressing down the icon (the AR date retrieval icon ARI3) of the AR retrieval date displayed on the display portion 17, the control portion 11 detects the press-down of the icon of the AR date retrieval by the sensor, and displays the input column, in which the date is input, together with the icon in which the keys of the alphabet and numbers are shown on the display portion 17.

In addition, when a user inputs the date in the input column by the icon in which the keys of the alphabet and numbers are shown, the control portion 11 retrieves and extracts the AR information table, to which the same date as that date is added, from the AR information memory portion 30.

Moreover, the control portion 11 reads the image identification information corresponding to the extracted AR information table, reads the image data of the image identification information from the memory portion 15, and displays the image data on the display portion 17 as the thumbnail image.

A user touches the thumbnail image displayed on the display portion 17, whereby the control portion 11 detects the touching of the thumbnail image by the sensor of the display portion 17 and detects the image identification information of the touched and selected image data.

Moreover, the control portion 11 reads the image data corresponding to the image identification information of the selected image data from the memory portion 15 and displays the image data on the display portion 17.

In addition, the control portion 11 reads the AR information table corresponding to the image identification information and displays the composition image (the AR image), in which the AR information and the AR related information are overlapped with the image data displayed in advance, on the display portion 17.

By the above-mentioned configuration, a user can view the image data of ten years ago and the AR information of ten years ago of the structure which is in the image data via the display portion 17.

Furthermore, by touching the icon (the AR switching icon ARI2) of the current AR information displayed on the display portion 17, the control portion 11 detects whether the icon of the current AR information display is touched by the detection signal of the touch sensor and extracts the AR information table of the image identification information of the image data from the AR information memory portion 30.

Moreover, the control portion 11 adds the latitude and longitude information, the azimuthal information, and the angle of view information when the AR information is acquired between the present and the past (for ten years in the case of the present embodiment) from the AR information table, and transmits the AR information retrieval request to the information retrieval system 2. In addition, the control portion 11 may acquire all of the AR information between the present and the past (for ten years in the case of the present embodiment) from the information retrieval system 2, from the AR information table.

When the information retrieval server 21 receives the AR information retrieval request from the digital camera 1, the information retrieval server 21 extracts the structure identification information of the structure in the retrieval range obtained by the latitude and longitude information, the azimuthal information and the angle of view information, which are added to the AR information retrieval request, from the map data of the database 22.

Moreover, the information retrieval server 21 reads the AR information of the structure corresponding to the structure identification information from the structure table of the database 22 and transmits the AR information to the digital camera 1.

As a result, the control portion 11 displays the AR information of the current existing structure with respect to the previous image data in an overlapped manner.

By the configuration, it can be easier to confirm the transition of the structure between the past and the present.

Furthermore, when the AR information at the time (e.g., ten years ago) of the imaging of the subject is reserved in the database 22 of the information retrieval server 21 in a date and time sequence or the like, the control portion 11 may acquire the AR information of the time information and display it on the display portion 17 based on the time information (e.g., the current, ten years ago, etc.) of the current and the past. A user can trace from the present to the past and can view the AR information corresponding to the image data in a time series.

Furthermore, in the above-mentioned configuration in which the user ID is set for each the image identification information of the image data, by the configuration capable of adding a plurality of user ID, it is possible to limit the disclosure of the AR information only among a plurality of friends (users). Furthermore, the user ID may be set for each the structure identification information, so that management can be performed for each the AR information of the structure. In this case, a mode of performing the writing of the user ID is set, so that the control portion 11 rushes (urges, persuades) the input of the user ID for each structure.

Moreover, when none of the user ID is set, the open display, that is, the viewing person (the user) is not limited, but anyone (the user) can view.

Only when the user ID is added to the AR information table corresponding to the selected image data, the control portion 11 displays the input column of the user ID and the icon, on which the keys of the alphabet and numbers are shown, on the display portion 17.

As described above, the combinations of the display of the AR information using the user ID are the following five types.

(1) the current (or the previous) image data and the composition image of the AR information of the structure in the current (or the previous) image data A user ID is added and a limitation display of a displayable user (2) the current (or the previous) image data and the composition image of the AR information of the structure in the current (or the previous) image data A user ID is not added and an open display in which all the users can be displayed (3) the current (or the previous) image data and the composition image of the AR information of the current structure which is in the retrieval range of the current (or the previous) image data A user ID is added and a limitation display of a displayable user (4) the current (or the previous) image data and the composition image of the AR information of the current structure which is in the retrieval range of the current (or the previous) image data A user ID is not added and an open display in which all the users can be displayed (5) display (AR information non-display) of only the current (or the previous) image data Furthermore, the control portion 11 can switch the display of the AR information using the user ID by the signal based on the selection of the AR user switching icon ARI4.

Figure 13:
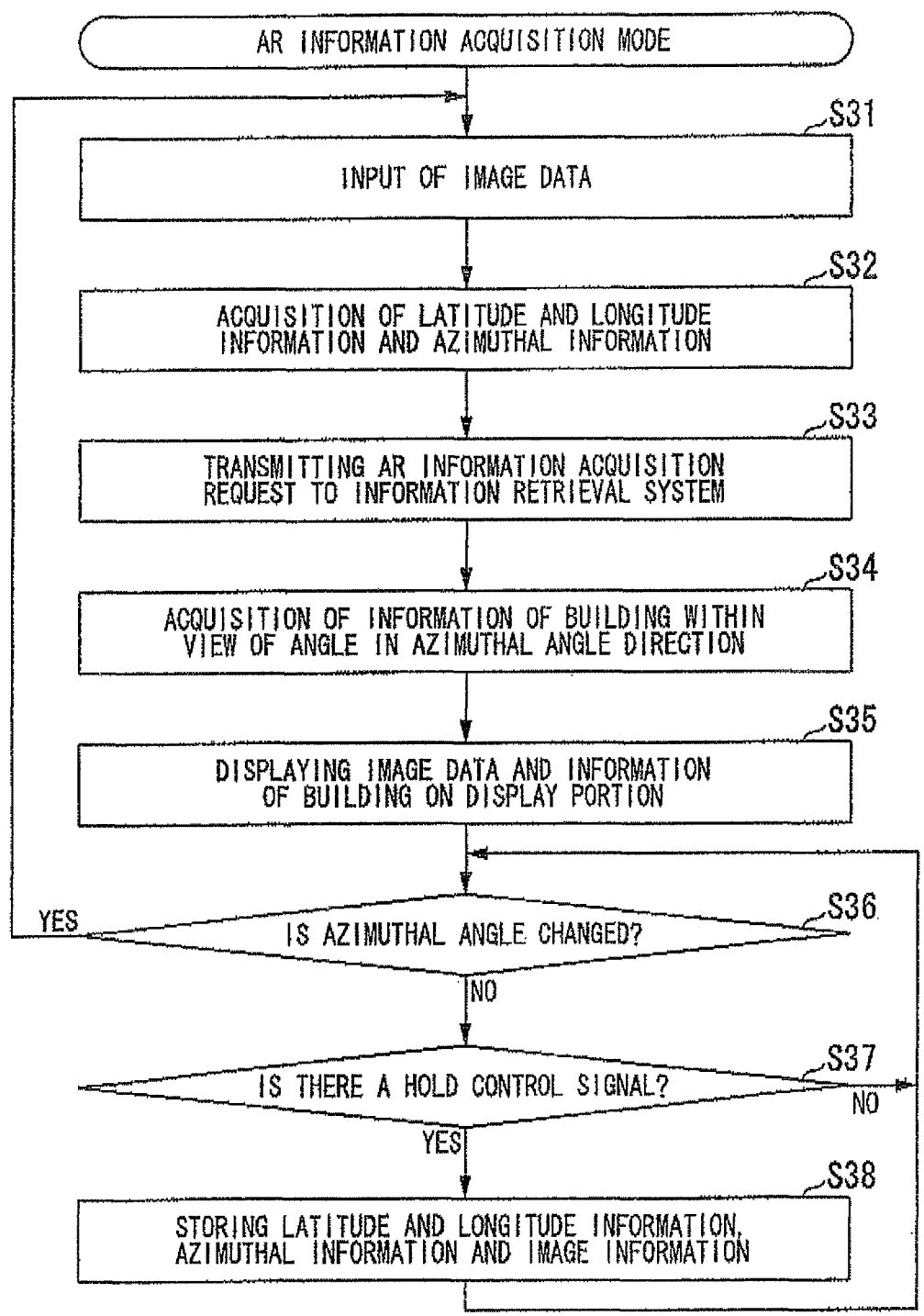
FIG. 13 is a flowchart that shows an operational example of the information retrieval system in FIG. 9.

Next, an operation of an information retrieval system of FIG. 9, which is another embodiment of the present invention, will be described using FIG. 13. FIG. 13 is a flowchart that shows an operation example of an information retrieval system according to another embodiment of the present invention.

When a user touches the icon (the AR information acquisition icon ARI1) of the AR information acquisition mode that is displayed on the display portion 17, the control portion 11 detects the touching of the icon of the AR information acquisition mode and sets the digital camera 1 to the AR information acquisition mode.

The control portion 11 displays the image data continuously supplied from the imaging portion 13 on the display portion 17 (step S31).

Moreover, the control portion 11 reads the latitude and longitude information (the positional information) showing the coordinate values of the latitude and the longitude, respectively and the azimuthal information showing the azimuthal angle of the optical axis of the digital camera 1 from each of the GPS 14 and the azimuthal sensor 16 (step S32).

At this time, the control portion 21 obtains the angle of view information in the digital camera 1 when performing the AR information acquisition request with respect to the information retrieval system 2 by reading the angle of view information from the focus distance and the magnification from the table in which the angle of view information corresponds to each combination of the focus distance and the magnification stored in the memory portion 15.

When the latitude and longitude information, the azimuthal information, and the angle of view information are obtained, the control portion 11 gives the AR information acquisition request the camera identification information, the latitude and longitude information, the azimuthal information and the angle of view information of the digital camera 1 and transmits the information to the information retrieval system 2 (step S33).

The information retrieval server 21 obtains the retrieval range retrieving the structure from the latitude and longitude information, the azimuthal information and the angle of view information supplied from the digital camera 1, retrieves the structure within the retrieval range from the map data of the database 22, and reads the AR information from the structure table using the structure identification information of the retrieved structure within the retrieval range (step S34).

Moreover, the information retrieval server 21 transmits the read AR information together with the structure identification information of the AR information to the digital camera 1 corresponding to the camera identification information.

Next, the control portion 11 calculates the coordinate positions of each structure in the display coordinate of the image data of the display portion 17 from the latitude and longitude information, the azimuthal information, the angle of view information, the retrieval distance (that is added to the AR information, and is transmitted from the information retrieval system 2), and the latitude and longitude information of the structure included in the supplied AR information, and displays the image data, and then, displays the AR information of each structure in the image data as the tag (step S35).

Moreover, the control portion 11 determines whether or not the azimuthal angle supplied from the azimuth sensor 16 is changed in a predetermined angle (distance) (step S36). That is, the control portion 11 obtains a difference between the azimuthal angle stored in the azimuthal angle memory portion and the azimuthal angle supplied from the azimuth sensor 16 and compares the difference with the preset angle (threshold amount of angle).

At this time, the control portion 11 decides that the azimuthal angle is changed when the difference is changed in (or beyond) a predetermined angle (threshold amount of angle) and returns the processing to step S31, on the other hand, the control portion 11 decides that the azimuthal angle is not changed when the difference is not changed in (or beyond) a predetermined angle (threshold amount of angle) and progresses the processing to step S37.

Next, the control portion 11 decides whether or not the hold control signal is supplied from the hold control portion 31 (step S37).

At this time, the control portion 11 progresses the processing to step S38 when the hold control signal is input, on the other hand, when the hold control signal is not input, the control portion 11 returns the processing to step S36.

Herein, the hold control portion 31, for example, compares the acceleration data from the acceleration sensor with a threshold value of the preset acceleration data. When the acceleration data supplied from the acceleration sensor is equal to or more than the threshold value of the acceleration data, the hold control portion 31 creates and transmits the hold control signal to the control portion 11. Meanwhile, when the acceleration data supplied from the acceleration sensor is equal to or less than the threshold value of the acceleration data, the hold control portion 31 does not perform a processing of transmitting the hold control signal to the control portion 11.

Moreover, the control portion 11 writes and stores the latitude and longitude information (the positional information) showing the coordinate values of the latitude and the longitude, respectively and the azimuthal information showing the azimuthal angle of the optical axis of the digital camera 1 from each of the GPS 14 and the azimuthal sensor 16 on the memory portion 15 (step S38). Then, the control portion 11 progresses (returns) the processing to step S36.

In the case of the AR information acquisition mode, in any one of the display or the non-display of the AR information, the flowchart of FIG. 13 is repeated.

As mentioned above, according to the present embodiment, the imaging direction of the digital camera 1 is changed, that is, the imaging direction is changed in a direction different from the acquisition direction of the AR information, and the display portion 17 is moved to a position most easily viewed by a user, whereby the confirmation of the AR information can be performed in the image data at the time of acquiring the AR information.

For example, it is possible to hold the AR information of the structure which is the image data from Tokyo station north entrance and confirm the AR information of the structure of the image data from Tokyo station north entrance on the table of the restaurant. Furthermore, in a state in which a user holds the AR information of the structure in a north direction from the current position and directs the digital camera 1 in a direction (e.g., a direction of the ground or an eastern direction) different from the north direction after the hold, a user can confirm the AR information of the structure of the held image date. Furthermore, the digital camera 1 in the present embodiment can perform the above-mentioned processing even in the case of being off-line in which the communication with the wireless base station 3 is not performed.

Next, a navigation function of the digital camera 1 will be described. Firstly, the AR information acquisition mode is set by a user and the image data and the AR information are displayed as the tag. Moreover, the same processing can be performed even in the AR display confirmation mode after holding the AR information.

When the icon of the navigation displayed on the display portion 17 is touched, the control portion 11 detects the touching of the icon of the navigation by the touch sensor and starts up the application (the navigation portion) of the navigation.

The control portion 11 displays the display of prompting the touching of the tag of the structure requiring the guidance on the display portion 17.

When a user touches the tag of the structure requiring the guidance, the control portion 11 detects the structure identification information corresponding to the tag of the touched structure, and reads the AR information table corresponding to the image identification information of the displayed image data from the AR information memory portion 30.

Moreover, the control portion 11 reads the latitude and longitude information of the structure from the AR information corresponding to the detected structure identification information from the AR information table, adds the latitude and longitude information of the current position of the digital camera 1 and the latitude and longitude information of the structure, and transmits the information to the information retrieval system 2 as the navigation request.

When receiving the navigation request, the information retrieval server 21 retrieves the shortest course (or a plurality of courses) between the added latitude and longitude information of the digital camera 1 and the latitude and longitude information of the structure from the map database stored in the database 22.

That is, the information retrieval server 21 extracts the nearest intersection from the coordinate value, where the digital camera 1 is situated, shown by the latitude and longitude information from the map data, and sets the intersection as a start intersection.

Similarly, the information retrieval server 21 extracts the nearest intersection from the coordinate value, where the structure is situated, shown by the latitude and longitude information from the map data, and sets the intersection as an end intersection.

Moreover, the information retrieval server 21 creates a combination of a plurality of road routes, which connects from the start intersection to the end intersection, from a road network of the map data, selects the route in which the distance of the respective combinations becomes the shortest, and for example, by an algorithm in a graph theory which effectively solves the existing shortest route problem such as a Dijkstra method of extracting the shortest route, the information retrieval server 21 extracts the combination of the road route in which the sum distance becomes the shortest.

Furthermore, the information retrieval server 21 transmits the image data of the map showing the road route front the start intersection to the end intersection to the digital camera 1 in which the navigation request is performed. Herein, the information retrieval server 21 creates the image data of the map by setting the display color of the guidance route (a road route connecting the start intersection to the end intersection) in the image data of the map to be different from other roads.

The control portion 11 changes the image data of the received map to a size which can be displayed on the display portion 17, and displays the image data of the map after being changed on the display portion 17.

Moreover, the control portion 11 disposes a mark showing its own position in a position on the image data of the map, which is displayed on the display portion 17, corresponding to the positions of the latitude and the longitude acquired by the GPS 14 in an overlapped manner. As a result, a user can receive the guidance service of the guidance from the start intersection to the end intersection while confirming the movement of its own mark.

Furthermore, the image data and the AR information of the structure of the image data may be transmitted from the digital camera 1 to another digital camera of another user, thereby performing the sharing of the information with another user.

In addition, the image data and the AR information of the structure in the image data may be uploaded from the digital camera 1 to a website such as an SNS (Social Networking Service) so that the information is shared with the plurality of other digital cameras. In this case, by adding the user ID to the AR information table, only a user who recognizes the user ID can read or add the AR information corresponding to the image data in the SNS.

Herein, the SNS server has an AR information sharing database in which the image data and the AR information are housed.

A user can add and register the user information from the digital camera 1 to the image data that he wants to register and the AR information corresponding to the image data.

Herein, when a user touches the icon of the user registration displayed on the display portion 17, the control portion 11 detects the touching of the icon by the touch sensor and displays the registration screen on the display portion 17. In the registration screen, the thumbnail image of the image data corresponding to the acquired AR information of a user, and the icon, on which the keys of the alphabet and numbers are shown, are included.

In the registration screen, a user selects the image data that he wants to register from the thumbnail image, inputs the user ID relative to the image data and the name (or the nick name) of the user himself, and touches the enter icon, whereby the control portion 11 accesses to the SNS server and transmits the image data and the AR information together with the registration request.

When the registration request is received, the SNS server creates the file of the name (or the rick name) of the user himself, and writes and stores the image data and the AR information, which are required to register, on the AR information sharing database. The file has the same configuration as the AR information table of FIG. 11.

Moreover, when a user touches the icon of the AR information reference that is displayed on the display portion 17 of the digital camera 1, the control portion 11 detects the touching of the icon by the touch sensor, and displays the reference screen on the display portion 17. In the reference screen, the icon, on which the keys of the alphabet and numbers are shown, is also included.

Next, in the registration screen, a user inputs the user name (or the nick name) that they want to refer and the user ID by touching the icon, on which the keys of the alphabet and numbers are shown, and touches the enter icon, whereby the control portion 11 accesses to the SNS server, and transmits the name (or the nick name) and the user ID together with the reference request of the image data and the AR information.

When the reference request is received, the SNS server retrieves the AR information sharing database by the name (or the nick name) added to the reference request, and extracts the file of the same name (or the nick name).

Moreover, the SNS server reads the image identification information to which the same user ID as the user ID received from the AR information of the file is added, and the image data corresponding to the image identification information, and transmits the read AR information and the image data to the digital camera 1.

As mentioned above, the control portion 11 displays the input image data and the AR information on the display portion 17.

Next, when a user touches the icon of the AR information change that is displayed on the display portion 17 of the digital camera 1, the control portion 11 detects the touching of the icon by the touch sensor, and displays the change screen on the display portion 17. In the change screen, the thumbnail image of the image data corresponding to the read AR information, the information writing column and the icon, on which the keys of the alphabet and numbers are shown, are included.

Moreover, in the change screen, when a user selects the image data of the AR information that he wants to change from the thumbnail image, the control portion 17 detects the selected image data by the touch sensor, displays the selected image data on the display portion 17, allows the image data to correspond to the positions of the respective structures on the displayed image data, and displays the tag of the AR information in an overlapped mariner.

Moreover, a user touches and selects the tag of the AR information that he wants to change, inputs the character row or the user ID which were added or edited to the information writing column by touching the keys of the alphabet and numbers, and touches the enter key (the enter icon), whereby the control portion 11 sets the character row input in the information writing column to the AR information of the new structure, and transmits the same together with the image identification information and the structure identification information, and the changed AR information to the SNS server as the change request including the name of the user and the user ID.

When the change request is received, the SNS server retrieves the AR information database by the name (or the nick name) added to the change request and extracts the file of the same name (or the nick name).

Moreover, the SNS server decides whether or not the user ID added to the image identification information coincides with the user ID added to the received change request, and when they do not coincide with each other, the SNS server does nothing and notifies the digital camera 1 that it cannot change.

On the other hand, when the user ID added to the AR information coincides with the user ID added to the received change request, the SNS server changes the AR information of the structure identification information in the image identification information.

Furthermore, a program for realizing the function of the hold of the AR information of the control portion 11 and the hold control portion 31 of the digital camera 1 in FIG. 9 is recorded on a computer readable recording medium, and the program recorded on the recording medium is read by the computer system and is executed, whereby the control of the AR information may be performed.

Furthermore, the program for realizing the function of the AR information retrieval of the information retrieval server 21 in FIG. 9 may be recorded in the recording medium readable by a computer, and the program recorded on the recording medium may be read and executed on a computer system, thereby performing the control of the retrieval of the AR information.

In addition, "the computer system" described herein includes hardware such as an OS or a peripheral appliance.

Furthermore, in the case of using a WWW system, "the computer system" also includes a home page provision environment (or a display environment).

Moreover, "the computer readable recording medium" refers to a transportable medium such as a flexible disk, an optical magnetic disk, a ROM, or a CD-ROM, or a memory device such as a hard disk built into the computer system. Furthermore, "the computer readable recording medium" also includes a medium which dynamically stores the program in a short time such as a communication line in the ease of transmitting the program via a network such as the Internet or a communication circuit such as the telephone circuit, and a medium which stores a program for a certain time a non-volatile memory in the computer system becoming a server or a client in that case. Furthermore, the program may be one for realizing a part of the above-mentioned functions, and may be one in which the above-mentioned functions can be realized by the combination with the program recorded in the computer system in advance.

As described above, the invention has been described with reference to the drawings, but the specific configuration is not limited to the embodiment, and a design of a range without departing from the gist of the invention or the like is also included.

While embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

What is claimed is:

1. An imaging device comprising:
   a body;
   an imager configured to image a subject;
   a positional information acquirer configured to acquire positional information of an imaging position of the body; and
   a hardware computer configured to:
   acquire information on the subject based on the positional information, and to display image data of the subject and the information on the subject on a display of the imaging device, the computer being operable in an augmented reality (AR) display mode; and
   output a hold control signal based on a user action while the computer is operating in the AR display mode, the hold control signal causing the computer to hold, on the display, the image data of the subject and the information on the subject displayed in the AR display mode and to continue displaying the held image data and the held information on the display after completion of the user action, the displayed information on the subject including at least one AR object, the computer being configured such that parameters of (a) contents of the image data of the subject displayed on the display, (b) the number of the at least one AR object displayed on the display, and (c) an arrangement of the at least one AR object with respect to the image data of the subject displayed on the display, immediately before the user action are respectively the same as those after completion of the user action.

2. The imaging device according to claim 1,
   wherein, in the AR display mode, the computer can switch between the display and the non-display of the information on the subject on the display.

3. The imaging device according to claim 1,
   wherein, when the hold control signal is received while imaging the subject, the computer displays the held image data of the subject and the held information on the subject on the display.

4. The imaging device according to claim 1,
   wherein the computer is configured to transmit the held information on the subject and the held image data of the subject to another terminal on the basis of the hold control signal.

5. An information acquisition system comprising:
   an imaging device and an information retrieval system;
   wherein the imaging device is the imaging device according to claim 1.

6. The imaging device according to claim 1, wherein the display has a touch panel that is configured to be operative for a touch operation while the image data of the subject and the information on the subject are held and displayed on the display.

7. The imaging device according to claim 1, further comprising an operation portion by which post information about the held image data of the subject and/or the held information on the subject is posted.

8. The imaging device according to claim 1, wherein the display has an input that is used to input post information while the image data of the subject and the information on the subject are held and displayed on the display.

9. The imaging device according to claim 1, wherein the display operates in a mode in which an icon is displayed for posting post information while the image data of the subject and the information on the subject are held and displayed on the display.

10. The imaging device according to claim 1,
    wherein the information on the subject includes coupon information,
    and wherein the computer is configured to hold the coupon information on the display based on the hold control signal.

11. The imaging device according to claim 1,
    wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

12. The imaging device according to claim 1,
    wherein the computer transmits the held information on the subject to an external device when the hold control signal is detected.

13. The imaging device according to claim 1,
    wherein the computer acquires further information on the subject when the display is touched after the holding.

14. The imaging device according to claim 1,
    wherein the information on the subject includes coupon information.

15. An imaging device comprising:
    a body;
    an imager;
    a memory;
    a latitude and longitude detector that detects latitude and longitude information of the body;
    a azimuthal angle detector which detects an azimuthal angle by which image data is imaged by the imager; and a hardware computer configured to:

acquire augmented reality (AR) information about a structure imaged by the imager based on the latitude and longitude information and the azimuthal angle, the computer being operable in a AR display mode in which a real-time image acquired by the imager and the augmented reality information are displayed on a display of the imaging device; and output a hold control signal upon detecting a predetermined user action while the computer is operating in the AR display mode, the hold control signal causing the computer to hold, on the display, the real-time image and the augmented reality information displayed in the AR display mode and to continue displaying the held real-time image and the held augmented reality information after completion of the predetermined user action, the AR information including at least one AR object, the computer being configured such that parameters of (a) contents of the real-time image displayed on the display, (b) the number of the at least one AR object displayed on the display, and (c) an arrangement of the at least one AR object with respect to the real-time image displayed on the display, immediately before the user action are respectively the same as those after completion of the user action.

16. The imaging device according to claim 15,
wherein, when the hold control signal is output, the computer stores the latitude and longitude information and the azimuthal angle of the body, detected during imaging of the image data, on the memory by adding an image identification information that identifies the image data.

17. The imaging device according to claim 15,
wherein, when the hold control signal is output, the computer stores the image data displayed on the display and the augmented reality information corresponding to the image data on the memory by adding an image identification information that identifies the image data.

18. The imaging device according to claim 15,
wherein the memory stores image identification information that identifies the image data for each image data, structure identification information that identifies a structure in the image data, structure information of a structure shown by the structure identification information, and a user ID added to the image identification information, for each image data.

19. The imaging device according to claim 15,
wherein the computer stores the augmented reality information and the image data in the memory based on the hold control signal, and reads the augmented reality information and the image data from the memory and displays the same on the display.

20. The imaging device according to claim 15,
wherein the computer transmits the augmented reality information added in an imaging state to an information retrieval system.

21. The imaging device according to claim 15,
wherein the user action includes at least one of an action by which a button provided on the body is pressed-down, an action by which a posture of the body is changed, an action by which the body is moved, an action by which the display is touched, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

22. The imaging device according to claim 15,
wherein the computer transmits the held information on the subject to an external device when the hold control signal is detected.

23. The imaging device according to claim 15,
wherein the computer acquires further information on the subject when the display is touched after the holding.

24. The imaging device according to claim 15,
wherein the information on the subject includes coupon information.

25. The imaging device according to claim 15,
wherein the AR information includes past AR information or present AR information.

26. The imaging device according to claim 15,
wherein the AR information includes an icon of navigation with respect to the structure.

27. An information acquisition system which includes an imaging device and an information retrieval system configured to extract a structure situated in a range of a direction based on latitude and longitude information and an azimuthal angle transmitted from the imaging device, and to transmit information about the extracted structure to the imaging device, the imaging device comprising:
a body;
an imager;
a latitude and longitude detector that detects the latitude and longitude information of the body;
an azimuthal angle detector which detects the azimuthal angle by which image data is imaged by the imager and
a hardware computer configured to:
acquire augmented reality (AR) information about the structure imaged by the imager based on the latitude and longitude information and the azimuthal angle, the computer being operable in an AR display mode in which a real-time image acquired by the imager and the augmented reality information are displayed on a display of the imaging device; and output a hold control signal upon detecting a predetermined user action while the computer is operating in the AR display mode, the hold control signal causing the computer to hold, on the display, the real-time image and the augmented reality information displayed in the AR display mode and to continue displaying the held real-time image data and the held augmented reality information on the display after completion of the predetermined user action, the AR information including at least one AR object, the computer being configured such that parameters of (a) contents of the real-time image displayed on the display, (b) the number of the at least one AR object displayed on the display, and (c) an arrangement of the at least one AR object with respect to the real- time image displayed on the display, immediately before the user action are respectively the same as those after completion of the user action, and the information retrieval system comprising:
a database which stores (i) a map data, in which a structure identification number of a structure corresponds to latitude and longitude information of the structure, and (ii) a structure table, in which the structure identification number corresponds to the augmented reality information of the structure shown by the structure identification number; and
an information retrieval server which (a) retrieves, from the map data, the structure identification number of the structure situated in the range of the direction based on the latitude and longitude information and the azimuthal angle transmitted from the imaging device, (b) reads the augmented reality information added to the structure shown by the structure identification number from the structure table, and (c) transmits the augmented reality information of the read structure to the imaging device.

28. The information acquisition system according to claim 27,
wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

29. The information acquisition system according to claim 27,
wherein the computer transmits the held information on the subject to an external device when the hold control signal is detected.

30. The information acquisition system according to claim 27,
wherein the computer acquires further information on the subject when the display is touched after the holding.

31. The information acquisition system according to claim 27,
wherein the information on the subject includes coupon information.

32. A non-transitory computer-readable storage medium that stores a program that allows a computer to execute functions of an imaging device so that the computer executes the steps comprising:
inputting positional information of a position, which is detected by a positional information acquirer, of a subject, image data of which is imaged by an imager of the imaging device;
acquiring information on the subject based on the positional information;
AR-displaying a real-time image acquired by the imager and the information on the subject on a display; and
outputting a hold control signal based on a user action during the AR-displaying, the hold control signal causing holding, on the display, of the real-time image and the information on the subject and continued displaying of the held real-time image data and the held information on the subject on the display after completion of the user action, the displayed information on the subject including at least one AR object, the holding being performed such that parameters of (a) contents of the image data of the subject displayed on the display, (b) the number of the at least one AR object displayed on the display, and (c) an arrangement of the at least one AR object with respect to the image data of the subject displayed on the display, immediately before the user action are respectively the same as those after completion of the user action.

33. The non-transitory computer-readable storage medium according to claim 32,
wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

34. The non-transitory computer-readable storage medium according to claim 32,
wherein the computer transmits the held information on the subject to an external device when the hold control signal is detected.

35. The non-transitory computer-readable storage medium according to claim 32,
wherein the computer acquires further information on the subject when the display is touched after the holding.

36. The non-transitory computer-readable storage medium according to claim 32,
wherein the information on the subject includes coupon information.

37. A non-transitory computer-readable storage medium that stores a program that allows a computer to execute functions of an imaging device so that the computer executes steps comprising:
inputting latitude and longitude information of a body of the imaging device which is detected by a latitude and longitude detector;
inputting an azimuthal angle by which image data is imaged by an imager of the imaging device, the azimuthal angle being detected by an azimuthal angle detector;
acquiring augmented reality information about a structure imaged by the imager based on the latitude and longitude information and the azimuthal angle;
AR-displaying a real-time image acquired by the imager and the augmented reality information on a display; and
outputting a hold control signal to the imaging device upon detecting a predetermined user action during the AR-displaying, the hold control signal causing holding, on the display, of the real-time image and the augmented reality information displayed in the AR-displaying and continued displaying of the held real-time image data and the held augmented reality information on the display after completion of the user action, the AR information including at least one AR object, the holding being configured such that parameters, of (a) contents of the real-time image displayed on the display, (b) the number of the at least one AR object displayed on the display, and (c) an arrangement of the at least one AR object with respect to the real-time image displayed on the display, immediately before the user action are respectively the same as those after completion of the user action.

38. The non-transitory computer-readable storage medium according to claim 37,
wherein the information on the subject includes coupon information.

39. An imaging device comprising:
a body;
an imager configured to image a subject;
a positional information acquirer configured to acquire positional information of an imaging position of the body; and
a hardware computer configured to:
display, on a display of the imaging device, a subject image acquired by the imager and subject information acquired based on the positional information, the computer being operable in an augmented reality (AR) display mode; and output a hold control signal based on a user action while the computer is operating in the AR display mode, the hold control signal causing the computer to keep displaying, on the display, the subject image and the subject information displayed in the AR display mode even if a position and/or a posture of the body is changed after completion of the user action, the displayed subject information including at least one AR object, the computer being configured such that parameters of (a) contents of the subject image displayed on the display, (b) the number of the at least one AR object displayed on the display, and (c) an arrangement of the at least one AR object with respect to the subject image displayed on the display, immediately before the user action are respectively the same as those after completion of the user action.

40. The imaging device according to claim 39, wherein the computer transmits the held information on the subject to an external device when the hold control signal is detected.

41. The imaging device according to claim 39, wherein the computer acquires further information on the subject when the display is touched after the holding.

42. The imaging device according to claim 39, wherein the information on the subject includes coupon information.

43. An imaging device comprising:
a body;
a sensor provided in the body;
an imager configured to image a subject;
a positional information acquirer configured to acquire positional information of an imaging position of the body; and
a hardware computer configured to:
display, on a display of the imaging device, a subject image acquired by the imager and subject information acquired based on the positional information, the computer being operable in an augmented reality (AR) display mode; and
output a hold control signal based on a detection by the sensor of a motion of the body according to a user action while the computer is operating in the AR display mode, the hold control signal causing the computer to hold, on the display, the subject image and the subject information displayed in the AR display mode and to continue displaying the held subject image and the held subject information on the display after completion of the user action.

44. The imaging device according to claim 43, wherein the computer transmits the held information on the subject to an external device when the hold control signal is detected.

45. The imaging device according to claim 43, wherein the computer acquires further information on the subject when the display is touched after the holding.

46. The imaging device according to claim 43, wherein the information on the subject includes coupon information.

47. An imaging device comprising:
a body;
an imager configured to image a subject; and
a hardware computer configured to:
display, on a display of the imaging device, a subject image acquired by the imager and subject information acquired based on a result of an image recognition for the subject image, the computer being operable in an augmented reality (AR) display mode; and
output a hold control signal based on a user action while the computer is operating in the AR display mode, the hold control signal causing the computer to hold, on the display, the subject image and the subject information displayed in the AR display mode and to continue displaying the held subject image and the held subject information on the display after completion of the user action, the displayed subject information including at least one AR object, the computer being configured such that parameters of (a) contents of the subject image displayed on the display, (b) the number of the at least one AR object displayed on the display, and (c) an arrangement of the at least one AR object with respect to the subject image displayed on the display, immediately before the user action are respectively the same as those after completion of the user action.

48. The imaging device according to claim 47, wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

49. The imaging device according to claim 47, wherein the computer transmits the held information on the subject to an external device when the hold control signal is detected.

50. The imaging device according to claim 47, wherein the computer acquires further information on the subject when the display is touched after the holding.

51. The imaging device according to claim 47, wherein the information on the subject includes coupon information.

52. An imaging device comprising:
a body;
an imager; and
a hardware computer configured to operate in:
an augmented reality (AR) display mode in which a real-time subject image acquired by the imager and subject information are displayed on a display of the imaging device, the subject information being acquired based on positional information of an imaging position and/or based on a result of an image recognition for the subject image; and
a holding mode, starting based on a user action while in the AR display mode, and in which the subject image and the subject information displayed in the AR display mode keep being displayed on the display even when a position and/or a posture of the body is changed after completion of the user action, the displayed subject information including at least one AR object, the holding mode being operated such that parameters of (a) contents of the subject image displayed on the display, (b) the number of the at least one AR object displayed on the display, and (c) an arrangement of the at least one AR object with respect to the subject image displayed on the display, immediately before the user action are respectively the same as those after completion of the user action.

53. The imaging device according to claim 52, wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

54. The imaging device according to claim 52,
wherein the computer transmits the held information on the subject to an external device when the hold control signal is detected.

55. The imaging device according to claim 52,
wherein the computer acquires further information on the subject when the display is touched after the holding.

56. The imaging device according to claim 52,
wherein the information on the subject includes coupon information.

57. An imaging device comprising:
a body;
an imager; and
a hardware computer configured to operate in:
an augmented reality (AR) display mode in which a real-time subject image of a subject acquired by the imager and subject information are displayed on a display of the imaging device, the subject information being acquired based on positional information of an imaging position and/or based on a result of an image recognition for the subject image; and
a holding mode, starting based on a user action while in the AR display mode, and in which the subject image and the subject information displayed in the AR display mode continue being displayed on the display even when the imager is directed not toward the subject image after the user action, the displayed subject information including at least one AR object, the holding mode being operated such that parameters of (a) contents of the subject image displayed on the display, (b) the number of the at least one AR object displayed on the display, and (c) an arrangement of the at least one AR object with respect to the subject image displayed on the display, immediately before the user action are respectively the same as those after completion of the user action.

58. The imaging device according to claim 57,
wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

59. The imaging device according to claim 57,
wherein the computer transmits the held information on the subject to an external device when the hold control signal is detected.

60. The imaging device according to claim 57,
wherein the computer acquires further information on the subject when the display is touched after the holding.

61. The imaging device according to claim 57,
wherein the information on the subject includes coupon information.

62. An imaging device comprising:
a body;
an imager configured to image a subject;
a button provided on the body such that the button is pressed down at least when a subject image is captured via the imager;
a positional information acquirer configured to acquire positional information of an imaging position of the body; and
a hardware computer configured to:
display, on a display of the imaging device, a subject image acquired by the imager and subject information acquired based on the positional information, the computer being operable in an augmented reality (AR) display mode; and
output a hold control signal based on a user action in which the button is pressed down while the computer is operating in the AR display mode, the hold control signal causing the computer to hold, on the display, the subject image and the subject information displayed in the AR display mode and, also after completion of the user action, to continue displaying the held subject image and the held subject information on the display.

63. The imaging device according to claim 62,
wherein the computer transmits the held information on the subject to an external device when the hold control signal is detected.

64. The imaging device according to claim 62,
wherein the computer acquires further information on the subject when the display is touched after the holding.

65. The imaging device according to claim 62,
wherein the information on the subject includes coupon information.

66. An imaging device comprising:
a body;
an imager configured to image a subject;
a touch panel type display provided on the body;
a positional information acquirer configured to acquire positional information of an imaging position of the body; and
a hardware computer configured to:
display, on the touch panel display, a subject image acquired by the imager and subject information acquired based on the positional information, the being operable in an augmented reality (AR) display mode; and
output a hold control signal based on a user action in which the touch panel display is touched while the computer operating in the AR display mode, the hold control signal causing the computer to hold, on the display, the subject image and the subject information displayed in the AR display mode and, also after completion of the user action, to continue displaying the held subject image and the held subject information on the display, the displayed subject information including at least one AR object, the computer being configured such that parameters of (a) contents of the subject image displayed on the display, (b) the number of the at least one AR object displayed on the display, and (c) an arrangement of the at least one AR object with respect to the subject image displayed on the display, immediately before the user action are respectively the same as those after completion of the user action.

67. The imaging device according to claim 66,
wherein the touch panel display has an icon related to the touch operation for the holding.

68. The imaging device according to claim 66,
wherein the computer transmits the held information on the subject to an external device when the hold control signal is detected.

69. imaging device according to claim 66,
wherein the computer acquires further information on the subject when the display is touched after the holding.

70. The imaging device according to claim 66,
wherein the information on the subject includes coupon information.

71. An imaging device comprising:
a body;
an imager configured to image a subject;
a positional information acquirer configured to acquire positional information of an imaging position of the body; and
a hardware computer configured to:
acquire information on the subject based on the positional information, and to display image data of the subject and the information on the subject on a display of the imaging device, the computer being operable in an augmented reality (AR) display mode; and
output a hold control signal based on a user action while the computer is operating in the AR display mode, the hold control signal causing the computer to hold, on the display, the image data of the subject and the information on the subject displayed in the AR display mode, the displayed information of the subject including at least one AR object, the computer being configured such that parameters of (a) contents of the image data of the subject displayed on the display, (b) the number of the at least one AR object displayed on the display, and (c) an arrangement of the at least one AR object with respect to the image data of the subject displayed on the display, immediately before the user action are respectively the same as those after completion of the user action, wherein the computer transmits the held information on the subject and the held image data of the subject to another terminal when the computer detects the hold control signal.

72. The imaging device according to claim 71,
wherein the user action includes at least one of an action by which a button provided on the body is pressed-down, an action by which the display is touched, an action by which a posture of the body is changed, an action by which the body is moved, an action by which a detected characteristic point of an image is moved in a preset distance in a time of a preset range, an action by which a detected contrast of an image is changed beyond a preset difference, and an action by which a change in an image pattern, which is equal to or greater than a predetermined threshold value, is to be detected.

73. The imaging device according to claim 71,
wherein the computer acquires further information on the subject when the display is touched after the holding.

74. The imaging device according to claim 71,
wherein the information on the subject includes coupon information.

\* \* \* \* \*